(12) United States Patent
Kitazawa et al.

(10) Patent No.: US 8,134,894 B2
(45) Date of Patent: Mar. 13, 2012

(54) SURFACE PLASMON POLARITON DIRECTION CHANGE DEVICE, READ/WRITE HEAD, LASER-ASSISTED MAGNETIC RECORDING APPARATUS, AND OPTICAL CIRCUIT

(75) Inventors: Tazuko Kitazawa, Yamatokoriyama (JP); Tomoki Ono, Tokyo (JP)

(73) Assignee: Sharp Kabushiki Kaisha, Osaka (JP)

( * ) Notice: Subject to any disclaimer, the term of this patent is extended or adjusted under 35 U.S.C. 154(b) by 365 days.

(21) Appl. No.: 12/445,718

(22) PCT Filed: Oct. 3, 2007

(86) PCT No.: PCT/JP2007/069370
§ 371 (c)(1),
(2), (4) Date: Apr. 15, 2009

(87) PCT Pub. No.: WO2008/047601
PCT Pub. Date: Apr. 24, 2008

(65) Prior Publication Data
US 2010/0215372 A1    Aug. 26, 2010

(30) Foreign Application Priority Data
Oct. 16, 2006  (JP) ................. 2006-281977

(51) Int. Cl.
*G11B 11/00* (2006.01)
*G02B 6/10* (2006.01)
(52) U.S. Cl. ..................... 369/13.32; 385/129
(58) Field of Classification Search ............ 369/13.32, 369/13.33, 300, 112.27; 360/59; 385/129; 358/129, 130, 131; 7/135; 250/216
See application file for complete search history.

(56) References Cited

U.S. PATENT DOCUMENTS
6,285,020 B1 *  9/2001  Kim et al. ............... 250/216
7,106,935 B2     9/2006  Challener
7,444,054 B2    10/2008  Challener
(Continued)

FOREIGN PATENT DOCUMENTS
JP   1-187535 A   7/1989
(Continued)

OTHER PUBLICATIONS
Burke et al., "Surface-polariton-like waves guided by thin, lossy metal films", Physical Review B, vol. 33, No. 8 (1986), pp. 5186-5201.
(Continued)

*Primary Examiner* — Ali Neyzari
(74) *Attorney, Agent, or Firm* — Birch, Stewart, Kolasch & Birch, LLP

(57) ABSTRACT

This invention provides a surface plasmon polariton direction change device (1) for changing a propagation direction of a surface plasmon polariton (5). The surface plasmon polariton direction change device (1) includes a metal film support member (2), and a first metal film (3) and a second metal film (4) which are provided on a predetermined surface of the metal film support member (2), are provided adjacently to each other, and are different from each other in effective refractive index. The surface plasmon polariton direction change device (1) is characterized in that the first metal film (3) and the second metal film (4) are provided so that, in at least a part of a boundary between the first metal film (3) and the second metal film (4), an angle θ formed between (i) a line perpendicular to the boundary and (ii) the propagation direction of the surface plasmon polariton (5) satisfies 0°<θ<90° or −90°<θ<0°, and (i) a surface of the first metal film (3) which is opposite to a surface in contact with the metal film support member (2) and (ii) a surface of the second metal film (4) which is opposite to a surface in contact with the metal film support member (2) are flush with each other.

20 Claims, 25 Drawing Sheets

U.S. PATENT DOCUMENTS

| | | | |
|---|---|---|---|
| 7,936,959 B2 * | 5/2011 | Challener | 385/129 |
| 2003/0137772 A1 | 7/2003 | Challener | |
| 2008/0291789 A1 | 11/2008 | Challener | |

FOREIGN PATENT DOCUMENTS

| | | |
|---|---|---|
| JP | 2004-273021 A | 9/2004 |
| JP | 2006-190446 A | 7/2006 |
| WO | WO-03/058641 A2 | 7/2003 |

OTHER PUBLICATIONS

Kitazawa et al., "SNOM Observations of Surface Plasmon Polaritons on Metal Heterostructures", Chin.Phy.Lett, vol. 24, No. 10, 2827-2829, (2007).

Kitazawa et. al., "Refraction of surface plasmon-polaritons at Au-Al boundaries observed by scanning near-filed optical microscopy", Physical Review B 77, pp. 193404-1 to 193404-4, (2008).

Stegeman et. al., "Refraction of a surface polariton by an interface", Physical Review B, vol. 23, No. 6, (1981), pp. 2576-2588.

Stegeman et. al., "Refraction of a surface polariton by an interface" Solid State communications, vol. 38, No. 12, (1983) 477-482.

Stegeman et. al., "Fresnel relations for surface polaritions at interfaces", Optics Letters, vol. 8, No. 12, (1983), pp. 626-628.

Maradudin et. al., "Surface Polariton Reflection and Transmission At a Barrier", Solid State Communications, vol. 46, No. 6, (1983), pp. 481-485.

* cited by examiner

SURFACE PLASMON POLARITON DIRECTION CHANGE DEVICE, READ/WRITE HEAD, LASER-ASSISTED MAGNETIC RECORDING APPARATUS, AND OPTICAL CIRCUIT

TECHNICAL FIELD

The present invention relates to a surface plasmon polariton direction change device for changing a propagation direction of a surface plasmon polariton which is one kind of near-field light; a read/write head, a laser-assisted magnetic recording apparatus, and an optical circuit which use the surface plasmon polariton direction change device.

BACKGROUND ART

It is possible to realize high densities in various technical fields, respectively, by reducing a diameter of so-called a light spot, which is a focal point onto which light is converged. For example, in the field of optical recording, data is recorded and reproduced on and from a recording medium, respectively, with the use of a laser beam. A reduction in diameter of a light spot enables high-density recording/reproducing. Further, in the field of optical fabrication, a material such as a resin or glass is fabricated with the use of a laser beam. A reduction in diameter of a light spot enables a finer fabrication of such a material. Furthermore, in the field of measurement using a microscope or the like, a reduction in diameter of a light spot allows an increase in measurement resolution.

In view of the circumstances, there have been demands for a reduction in diameter of a light spot in each of the technical fields, utilizing light, such as the optical recording, optical fabrication and the measurement by means of a microscope. However, in a case where normal light is used, a size of a light spot is limited to that almost equal to a wavelength of light due to a diffraction limit, and so it was difficult to further reduce the size of the light spot. Therefore, a method utilizing near-field light which exists locally is attracting attention as a method for forming a light spot smaller than a diffraction limit of light in spite of using normal light.

The near-field light is localized light (electromagnetic field) which is generated while a minute structure smaller than the wavelength of light (e.g. aperture) is irradiated by the light. The near-field light exists only in the vicinity of the aperture. The near-field light generated in the vicinity of the aperture remains in the vicinity of the aperture and is not propagated to other area.

In a case where light from a light source is incident on an aperture whose diameter is larger than the wavelength of the light, the light is partially blocked, but propagates and passes through the aperture. As such, no near-field light is generated. In contrast, in a case where an aperture has a diameter smaller than the wavelength of incident light, the incident light hardly passes through the aperture, and near-field light is generated in the vicinity of the aperture. The near-field light thus generated has an intensity distribution whose size is substantially the same as the diameter of the aperture. This makes it possible to obtain a light spot smaller than the diffraction limit in the vicinity of the aperture.

The light spot thus obtained whose diameter is reduced can be suitably used in a laser-assisted magnetic recording method. The laser-assisted magnetic recording method has been attracting attention as a promising technique for a next-generation high-density magnetic recording. The laser-assisted magnetic recording method is a method for conducting a magnetic recording with respect to a magnetic recording medium having high thermal fluctuation resistance and high coercive force. Specifically, light is converged onto a surface of the magnetic recording medium so that the magnetic recording medium has a local temperature rise. This causes a reduction in coercive force of the magnetic recording medium. This allows a normal magnetic head to carry out a magnetic recording with respect to the magnetic recording medium.

However, a light spot obtained with the use of the above method has low light use efficiency. This is because the light which can not be converged to a light spot having a diameter of not more than a wavelength of the light is incident on the aperture which is not more than the wavelength of the light. That is, when a light source has the same intensity as a conventional one, an intensity of the near-field light becomes has intensity smaller by an amount corresponding to the size of the aperture than an amount corresponding to the size of the light incident on the aperture. Further, the intensity of the light sharply declines as the light is farther away from a point where the light is generated because the light is localized.

Therefore, the following method is used. Specifically, according to this method, (i) light is caused to be incident on an aperture made from a metal film so that a surface plasmon polariton is generated on the metal film, and then (ii) the surface plasmon polariton is amplified so that strong near-field light is generated. Further, the near-field light localized in the aperture can be propagated toward any position because a surface plasmon polariton is used.

Patent Literature 1 discloses a technique in which near-field light, which is propagated toward any position by a surface plasmon polariton, is used in the laser-assisted magnetic recording method. The following description deals with the technique disclosed in the Patent Literature 1 with reference to FIGS. 14 and 15. FIG. 14 is a perspective view illustrating a conventional read/write head 101 used in the laser-assisted magnetic recording method. FIG. 15 is a cross-sectional view of the read/write head 101, which cross-sectional view is obtained when the read/write head 101 of FIG. 14 is viewed from its side.

According to the read/write head 101 disclosed in the Patent Literature 1, an irradiated surface 104 is irradiated by a laser beam 102 from a top surface of a near-field light head 103; and an electric vibration wave (surface plasmon polariton) is excited in a laser spot 105 formed on the irradiated surface 104. As shown in FIG. 15, the electric vibration wave thus excited in the laser spot 105 is propagated toward a radiation section 107 via a waveguide 106. A recording medium 110 is irradiated by near-field light 108 via the radiation section 107. While the recording medium 110 is thus irradiated by the near-field light 108 from the radiation section 107, the recording medium 110 has a heated portion. Under the circumstances, a magnetic head 109 records information on the heated portion.

In the near-field light head 103, (i) a surface which is irradiated by the laser beam 102 and (ii) a surface on which the radiation section 107 is provided are successively connected to each other so that the electric vibration wave changes its propagation direction. In the near-field light head 103, the irradiated surface 104 becomes narrower so that the electric vibration wave excited in the laser spot 105 is concentrated in the radiation section 107. However, in this method, it is impossible to change a propagation direction of a surface plasmon polariton within a surface in which the surface plasmon polariton is propagated. This causes less flexibility of the provision of a recording magnetic field generating section and a reading element.

In view of the circumstances, Patent Literature 2 discloses a technique for changing a propagation direction of a surface plasmon polariton within a surface in which the surface plasmon polariton is propagated. The following description deals with the technique disclosed in the Patent Literature 2 with reference to FIGS. 16 and 17. FIG. 16 is a perspective view schematically illustrating an arrangement of a conventional metal film 201, having two kinds of thickness, for causing a surface plasmon polariton to be propagated and refracted, the metal film 201. FIG. 17 is a perspective view showing a surface plasmon lens 211 for converging a surface plasmon polariton.

As shown in FIG. 16, the metal film 201 includes a first metal film 202 and a second metal film 203 which are different in thickness. The difference in thickness gives rise to a difference in effective refraction index. This causes a surface plasmon polariton 204 excited in the first metal film 202 to be refracted at a boundary between the first metal film 202 and the second metal film 203.

With the arrangement, it is possible to change the propagation direction of the surface plasmon polariton 204 at the boundary between the first metal film 202 and the second metal film 203 which are difference in thickness. It is thus possible, with such a simple arrangement, to propagate a surface plasmon polariton toward any position.

Further, as shown in FIG. 17, the surface plasmon lens 211 is arranged such that a metal film 215 is provided on a top surface of a dielectric layer 216; and (i) a first dielectric layer 213 having a low refractive index and (ii) a second dielectric layer having a refractive index higher than the first dielectric layer 213 are provided on a surface of the metal film 215 which is opposite to a surface in contact with the dielectric layer 216. The first dielectric layer 213 can be air. Therefore, the first dielectric layer 213 is not shown in FIG. 17.

In the surface plasmon lens 211, when a laser beam 212 is incident between (i) the metal film 215 on which the first dielectric layer 213 is provided and (ii) dielectric layer 216, the surface plasmon polariton 204 is excited between the metal film 215 and the first dielectric layer 213. The effective refractive index of the metal layer 215 changes depending on a medium with which the metal layer 215 is in contact. Therefore, the surface plasmon polariton 204 propagates toward the second dielectric layer 214, and is refracted at the boundary between the first dielectric layer 213 and the second dielectric layer 214.

With the arrangement, it is possible to change the propagation direction of the surface plasmon polariton 204 at the boundary between the first dielectric layer 213 and the second dielectric layer 214, which are provided on the metal film 215 and are different in refractive index. It is thus possible, with such a simple arrangement, to propagate a surface plasmon polariton toward any position.

Note however that the effective refractive index of the surface plasmon lens 211 disclosed in the Patent Literature 2 varies depending on not only the refractive indices of the first dielectric layer 213 and the second dielectric layer 214 but also the thickness of the metal film 215. Further, in the surface plasmon lens 211, the surface plasmon polariton 204 is excited in an asymmetric mode (later described). Therefore, as described in a Non-patent Literature 1, the thinner the metal film 215 becomes, the larger the effective refractive index becomes and the shorter the propagation length becomes.

As such, if the thickness of the metal film 215 is reduced so that the surface plasmon polariton 204 is sufficiently refracted at the boundary between the first dielectric layer 213 and the second dielectric layer 214, then the propagation length will become short in the surface plasmon lens 211, i.e., several times the wavelength of the surface plasmon polariton 204 or not more than the wavelength.

Further, according to the surface plasmon lens 211, it is only possible to obtain near-field light whose intensity is reduced by an amount corresponding to the thickness of the second dielectric layer 214, in a case of utilizing the near-field light which is excited in a direction perpendicular to the metal film 215 on which the first dielectric layer 213 and the second dielectric layer 214 are provided.

Here, the effective refractive index n of a metal film is expressed as follows:

$$n = Re(\beta c/\omega)$$

where $\beta$ indicates a wave number vector in a propagation direction of a surface plasmon polariton, c indicates the speed of light, and $\omega$ indicates the angular frequency of the surface plasmon polariton.

Further, the intensity of a surface plasmon polariton is attenuated as the surface plasmon polariton propagates on a metal film. A distance at which the intensity of a surface plasmon polariton becomes 1/e as large as the original one is referred to as a propagation length. The propagation length L which is a parameter indicating intensity attenuation of a surface plasmon polariton is expressed as follows:

$$L = 1/Im(\beta)/2$$

The wave number vector $\beta$ in a propagation direction of a surface plasmon polariton varies depending on the frequency of the surface plasmon polariton, a mode of the surface plasmon polariton, a metal material constituting a metal film, the thickness of the metal film, and a material with which the metal film is in contact.

The following description deals with modes of a surface plasmon polariton. Generally, a surface plasmon polariton which is propagated on a metal film has two modes. One of them is a symmetric mode in which surface plasmon polaritons on both sides of a metal film are symmetrically coupled. Such surface plasmon polaritons are excited in Kretchmann configuration which is later described. The other of the two modes is an asymmetric mode in which surface plasmon polaritons on both sides of a metal film are asymmetrically coupled. Such surface plasmon polaritons are excited in Otto configuration which is later described.

Therefore, the wave number vector $\beta$ in a propagation direction of a surface plasmon polariton has two values corresponding to the two modes of the surface plasmon polariton. The Non Patent Literature 1 deals with this in detail.

CITATION LIST

Patent Literature 1

Japanese Patent Application Publication Tokukai No. 2004-273021 (publication date: Sep. 30, 2004)

Patent Literature 2

U.S. Patent Application Publication No. 2003-0137772 (publication date: Jan. 24, 2003)

Non Patent Literature 1

"Surface-polariton-like waves guided by thin, lossy metal film" J. J. Burke and G. I. Stegeman, Physical Review B, 33, 5186, (1986)

Non Patent Literature 2

"Electromagnetic energy transfer and switching in nanoparticle chain arrays below the diffraction limit" Mark L.

Brongersma, John W. Hartman, and Harry A. Atwater, Physical Review B, 62, 16356, (2000)

SUMMARY OF INVENTION

According to the metal film 201 disclosed in the Patent Literature 2 out of the conventional techniques, it is necessary to take into consideration an effective refractive index ratio between the first metal film 202 and the second metal film 203 in order to sufficiently change a direction of the surface plasmon polariton 204 at the boundary between the first metal film 202 and the second metal film 203. However, a difference in thickness between the first metal film 202 and the second metal film 203 will inevitably become very large, in a case where it is intended to realize the effective refractive index ratio between the first metal film 202 and the second metal film 203 so that the direction of the surface plasmon polariton 204 is sufficiently changed.

This causes the surface plasmon polariton 204 to be scattered at an edge of the first metal film 202 while the surface plasmon polariton 204 is being propagated on the surfaces of the first metal film 202 and the second metal film 203. The light thus scattered causes a background noise. Further, for example, in a case where the metal film 201 which has a step as described above is applied to a laser-assisted magnetic recording apparatus, physical interference with another member is caused due to the step. Further, it is difficult to form a film on the metal film 201 due to the step.

Meanwhile, according to the surface plasmon lens 211 disclosed in the Patent Literature 2, an edge of the first dielectric layer 213 or an edge of the second dielectric layer 214 appears, in a case where one of the first dielectric layer 213 and the second dielectric layer 214 is air, which has a low dielectric constant, so that the surface plasmon lens 211 has a great refraction angle, then. This causes scattering of the surface plasmon polariton 204 at the edge when the surface plasmon polariton 204 is propagated on a surface of the metal film 215. The scattered light causes a background noise.

Further, for example, in a case where the metal film 201 which has a step as described above is applied to a laser-assisted magnetic recording apparatus, physical interference with another member is caused due to the step. Further, it is difficult to form a film on the metal film 215 due to the step.

The present invention was attained in view of the above problems. An object of the present invention is to provide, with a simple arrangement, (i) a surface plasmon polariton direction change device which can prevent scattering of a surface plasmon polariton at an edge, (ii) a read/write head, (iii) a laser-assisted magnetic recording apparatus, and (iv) an optical circuit.

In order to solve the above problems, a surface plasmon polariton direction change device of the present invention is a surface plasmon polariton direction change device for changing a propagation direction of a surface plasmon polariton, including: a metal film support member, and at least two metal films which are provided on a predetermined surface of the metal film support member, are adjacent to each other, and are different from each other in effective refractive index, said at least two metal films being provided so that, in at least a part of respective boundary between adjacent ones of said at least two metal films, an angle $\theta$ defined by (i) a line perpendicular to the boundary and (ii) the propagation direction of the surface plasmon polariton satisfies $0°<\theta<90°$ or $-90°<\theta<0°$, and surfaces of said at least two metal films which surfaces are opposite to surfaces in contact with the metal film support member being flush with each other.

According to the above arrangement, metal films which are formed on a predetermined surface of a metal film support member, are adjacent to each other, and are different from each other in effective refractive index are provided so that, in at least a part of respective boundary between the metal films, an angle $\theta$ formed between (i) a line perpendicular to the boundary and (ii) a propagation direction of the surface plasmon polariton satisfies $0°<\theta<90°$ or $-90°<\theta<0°$. This makes it possible to change the propagation direction of the surface plasmon polariton at the boundary.

Further, a propagation direction of a surface plasmon polariton can be adjusted in accordance with adjustments of the angle $\theta$. Therefore, a surface plasmon polariton direction change device of the present invention offers (i) greater flexibility in designing and (ii) easier control of a propagation direction of a surface plasmon polariton, as compared with the surface plasmon lens 211 disclosed in the Patent Literature 2 which changes a propagation direction of a surface plasmon polariton by changing a thickness of the metal film 215 and refractive indices of the first dielectric layer 213 and the second dielectric layer 214.

Here, it is possible to prevent scattering of the surface plasmon polariton at an edge between the metal films and to prevent the surface plasmon polariton from being irradiated onto an irradiated subject.

As a result, a surface plasmon polariton direction change device of the present invention can increase intensity of a surface plasmon polariton propagated to an adjacent metal film and can prevent a background noise due to scattered light. Further, it is unnecessary to worry about a difference in thickness when some sort of film is formed on a surface plasmon polariton direction change device of the present invention.

A read/write head of the present invention is a read/write head for use in a laser-assisted magnetic recording apparatus for recording and reproducing information on and from a magnetic recording medium, respectively, including: the surface plasmon polariton direction change device, a light source, near-field light excitation means for converting light emitted from the light source into a surface plasmon polariton, and near-field light output means for irradiating the magnetic recording medium with near-field light, the surface plasmon polariton direction change device causing the surface plasmon polariton to be propagated from the near-field light excitation means toward the near-field light output means.

According to the above arrangement, a surface plasmon polariton which is converted from light from a light source at a near-field light excitation section can be propagated to near-field light output means for irradiating a magnetic recording medium with near-field light.

This makes it possible to apply near-field light and a magnetic field to a magnetic recording medium so that the near-field light and the magnetic field are close to each other even if (i) the magnetic field generating section for applying a magnetic field to a magnetic recording medium and (ii) a light source are provided apart from each other in a read/write head. This is because the near-field light output means is provided in the vicinity of a magnetic field generating section.

Further, the above arrangement allows greater flexibility in disposing a reading element so that (i) the reading element can be prevented from being deteriorated due to heat of the light source and from being influenced by a magnetic field generated by the magnetic field generating section and (ii) accurate tracking can be performed. This allows a reduction in size and weight of the whole device.

Further, a laser-assisted magnetic recording apparatus of the present invention is a laser-assisted magnetic recording apparatus for recording and reproducing information on and from a magnetic recording medium, respectively, including the read/write head.

The above arrangement makes it possible to prevent scattering of a surface plasmon polariton at an edge and to obtain a laser-assisted magnetic recording apparatus having high flexibility in designing.

BRIEF DESCRIPTION OF DRAWINGS

FIG. 1 (b) is a plan view illustrating the surface plasmon polariton direction change device, in which an incident angle and a reflection angle of a surface plasmon polariton to a line perpendicular to a boundary between a first metal film and a second metal film are illustrated.

DESCRIPTION OF EMBODIMENTS

One embodiment of the present invention is described below with reference to FIGS. 1 through 13.

A surface plasmon polariton direction change device of the present invention includes at least two metal films which are provided on a predetermined surface of a metal film support member, are adjacent to each other, and are different form each other in effective refractive index. The surface plasmon polariton direction change device causes a surface plasmon polariton to be propagated from one of said at least two metal films toward the other one of said at least two metal films. This causes a change in propagation direction of the surface plasmon polariton at a boundary between said at least two metal films.

Embodiment 1

Figure 1:
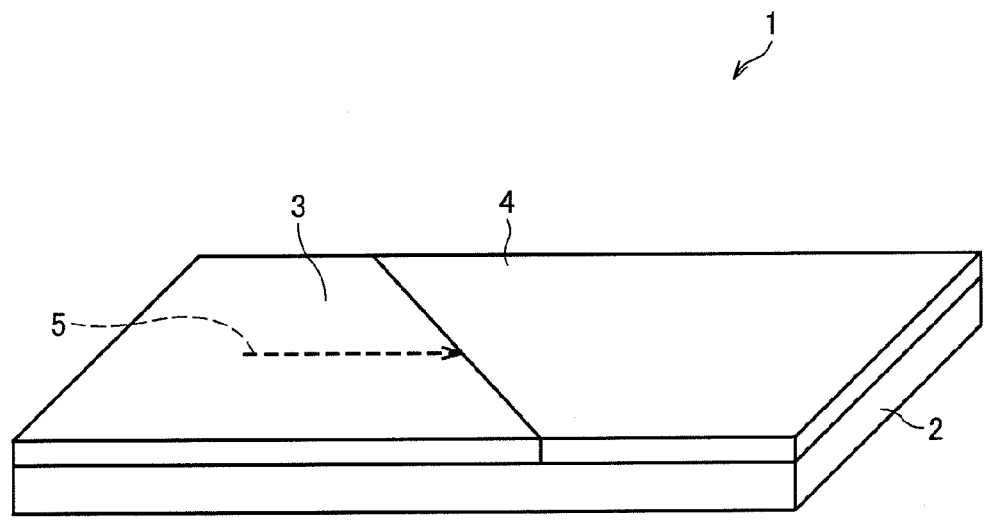
FIG. 1 (a) is a perspective view schematically illustrating an arrangement of a surface plasmon polariton direction change device of an Embodiment 1 of the present invention.
Figure 1:
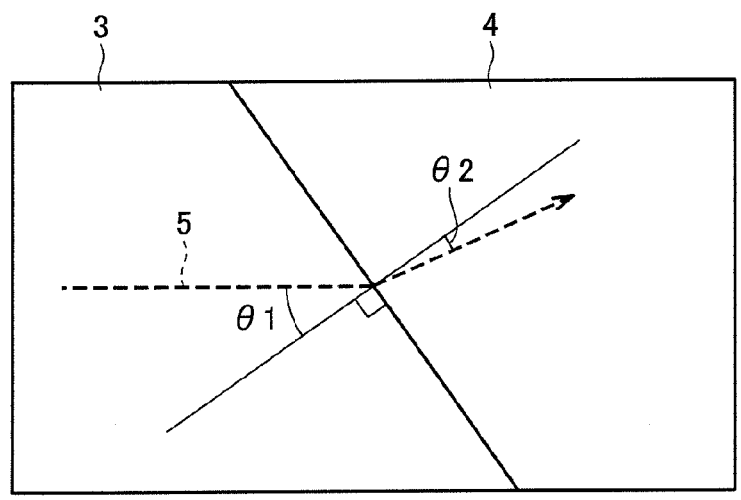

First, a surface plasmon polariton change device 1 of an Embodiment 1 in accordance with the present invention is described below with reference to FIGS. 1 through 4. FIG. 1 (a) is a perspective view schematically illustrating an arrangement of the surface plasmon polariton direction change device 1 of the present embodiment. FIG. 1 (b) is a plan view illustrating the surface plasmon polariton direction change device 1, and shows that an incident angle and a reflection angle of a surface plasmon polariton to a line perpendicular to a boundary between a first metal film and a second metal film. Note that the arrows shown in FIGS. 1 (a) and 1 (b) indicate a propagation direction of a surface plasmon polariton 5.

As shown in FIGS. 1 (a) and 1 (b), the surface plasmon polariton direction change device 1 of the present embodiment includes a metal film support member 2, a first metal film 3 and a second metal film 4.

The surface plasmon polariton direction change device 1 of the present embodiment causes a surface plasmon polariton 5 to be propagated from one of the first metal film 3 and the second metal film 4 toward the other one of the first metal film 3 and the second metal film 4. This causes a change in propagation direction of the surface plasmon polariton 5 at a boundary between the first metal film 3 and the second metal film 4. The surface plasmon polariton direction change device 1 is suitably applicable to a magnetic recording device for use in a laser-assisted magnetic recording.

The surface plasmon polariton direction change device 1 of the present embodiment can be arranged such that a surface plasmon polariton 5 is generated in one of the first metal film 3 and the second metal film 4. A method for generating a surface plasmon polariton 5 in one of the first metal film 3 and the second metal film 4 is described later and therefore is not described here. Further, the surface plasmon polariton direction change device 1 of the present embodiment can be arranged so as to be used as a part of a surface plasmon polariton waveguide. The following description deals with an arrangement in which the surface plasmon polariton 5 is propagated from the first metal film 3 toward the second metal film 4.

The metal film support member 2 is a base on which the first metal film 3 and the second metal film 4 are provided. In FIG. 1 (a), the metal film support member 2 is illustrated as a plate having a predetermined thickness. However, the present invention is not limited to this. The metal film support member 2 can be arranged so as to have a top surface that serves as an output surface of a light source and the first metal film 3 and the second metal film 4 are provided on the top surface. That is, the metal film support member 2 is not limited in view of shape and arrangement, provided that the first metal film 3 and the second metal film 4 can be provided.

Further, the provision of a metal film support member 2 allows a surface plasmon polariton 5 to be generated in a first metal film 3 or in a second metal film 4. In this case, a substrate having light transmittance is used as the metal film support member 2.

In this case, crown glass such as fused silica or BK7 (Schott Glass), flint glass such as F2 or SF11, a ceramic such as Lumicera (Murata Manufacturing CO., Ltd.), or an optical crystal such as SiO2 or sapphire is suitably used as a material from which the metal film support member 2 is made. Instead, an optical resin such as acrylonitride-butadiene-styrene, polycarbonate, polystyrene, polypropylene, polyoxymethylene, polyester acrylate, epoxy acrylate, urethane acrylate, polyether acrylate, acrylic resin, or polyolefin resin is suitably used as a material from which the metal film support member 2 is made. Alternatively, the metal film support member 2 can be arranged so as to cause only a specific wavelength to pass through, like a silicon substrate.

Furthermore, in a case where a surface plasmon polariton 5 is generated in a first metal film 3 or in a second metal film 4 with the use of the metal film support member 2, a dielectric film provided on another support member (e.g. an output surface of a light source) can be used as the metal film support member 2 instead of a transparent substrate. A dielectric material from which the dielectric film is made is not limited, provided that the dielectric material has light transmittance. MgF2, TiO2, Ta2O3, ZnO, Al2O3, SiN or MN can be used as the dielectric material instead of the above substrate material.

The first metal film 3 and the second metal film 4 have the same thickness and are adjacent to each other. Further, although the first metal film 3 and the second metal film 4 have the same thickness, the first metal film 3 and the second metal film 4 are different in effective refractive index. This is because the first metal film 3 and the second metal film 4 are made of different types of metal, respectively.

In FIGS. 1 (a) and 1 (b), the surface plasmon polariton direction change device 1 has a rectangular shape. However, the present embodiment is not limited to this. That is, the surface plasmon polariton direction change device 1 can have any shape, provided that metal films, which have the same thickness and are made of different metal materials, are provided adjacently to each other.

The surface plasmon polariton 5 is refracted at a boundary between the first metal film 3 and the second metal film 4 based on the same principle as refraction of light. A refraction angle of the surface plasmon polariton 5 varies depending on (i) an effective refractive index ratio between the first metal film 3 and the second metal film 4 and (ii) an incident angle of the surface plasmon polariton 5 to the boundary between the first metal film 3 and the second metal film 4.

Here, the incident angle is defined as an angle $\theta 1$ ($\theta$) ($0° < \theta 1 < 90°$) formed between (i) a line perpendicular to the boundary between the first metal film 3 and the second metal film 4 and (ii) a propagation direction of the surface plasmon polariton 5, in a case where the surface plasmon polariton 5 is propagated, on a surface of the first metal film 3, toward the boundary as shown in FIG. 1 (b). Further, the refraction angle is defined as an angle $\theta 2$ ($0° < \theta 2 < 90°$ formed between (i) the line perpendicular to the boundary between the first metal film 3 and the second metal film 4 and (ii) a propagation direction of the surface plasmon polariton 5 on a surface of the second metal film 4, in a case where the surface plasmon polariton 5 is propagated from the first metal film 3 to the surface of the second metal film 4.

The following description deals with a relationship between (i) the effective refractive index ratio between the first metal film 3 and the second metal film 4 and (ii) respective of the incident angle and the refraction angle of the surface plasmon polariton 5 to the boundary between the first metal film 3 and the second metal film 4.

The relationship between (i) the effective refractive index ratio between the first metal film 3 and the second metal film 4 and (ii) respective of the incident angle and the refraction angle of the surface plasmon polariton 5 to the boundary between the first metal film 3 and the second metal film 4, i.e., how much the propagation direction of a surface plasmon polariton is changed is expressed based on the same principle as refraction of light (Snell's law) as follows:

$$n1^* \sin \theta = n2^* \sin \theta 2$$

Note that n1 indicates an effective refractive index of the first metal film 3, and n2 indicates an effective refractive index of the second metal film 4. That is, the larger the ratio between n1 and n2 becomes, the larger the change in propagation direction at the boundary between the first metal film 3 and the second metal film 4 becomes.

Further, as described above, the effective refractive indices of the first metal film 3 and the second metal film 4 vary depending on (i) metal materials of which the metal films are made, (ii) a mode of the surface plasmon polariton 5, (iii) thicknesses of the metal films, (iv) a refractive index of a medium with which the metal films are in contact. That is, even if the first metal film 3 and the second metal film 4 are made of the same material, it is possible to realize a different effective refractive index between the first metal film 3 and the second metal film 4, by changing (i) a mode of the surface plasmon polariton 5, (ii) their thicknesses or (iii) the refractive index of a medium with which the first metal film 3 or the second metal film 4 is in contact.

The boundary between the first metal film 3 and the second metal film 4 is provided so that the incident angle θ1 satisfies 0°<θ1<90° in a case where the surface plasmon polariton 5 is propagated from the first metal film 3 toward the boundary between the first metal film 3 and the second metal film 4. Note that the boundary between the first metal film 3 and the second metal film 4 includes a case where the two types of metal constituting the boundary are mixed with each other in a width equal or smaller than a wavelength of the surface plasmon polariton 5. In this case, the boundary means a center line of the width in which the two types of metal are mixed with each other.

The intensity of the surface plasmon polariton 5 is attenuated as the surface plasmon polariton 5 propagates on the surfaces of the first metal film 3 and the second metal film 4. A distance where the intensity of the surface plasmon polariton 5 becomes 1/e as large as the original one is called propagation length. The propagation length varies depending on the metal materials and thicknesses of a first metal film 3 and a second metal film 4 on which the surface plasmon polariton 5 is propagated. The propagation length widely ranges from several tens of nm to several tens of μm in accordance with the metal materials and thicknesses of the first metal film 3 and the second metal film 4. Therefore, it is necessary to arrange the first metal film 3 and the second metal film 4 so that the propagation length does not become too short.

For example, the propagation length becomes approximately 14 μm in a case where a surface plasmon polariton is excited with the use of the Kretchmann configuration (later described) under the condition that (i) the surface plasmon polariton is excited in a metal film made of Al by light having a wavelength of 600 nm, and (ii) the metal film has a thickness of approximately 12 nm. On the other hand, the propagation length becomes approximately 1.5 μm in a case where a surface plasmon polariton is excited with the use of the Otto configuration (later described) under the same condition as above. Similarly, the propagation length becomes approximately 20 μm in a case where a surface plasmon polariton is excited with the Kretchmann configuration under the condition that (i) the surface plasmon polariton is excited by light having a wavelength of 600 nm, (ii) the surface plasmon polariton is excited in a metal film made of Ag, and (iii) thickness of the metal film is approximately 50 nm. As described above, the propagation length can be adjusted in accordance with adjustments of a wavelength of light, a type of metal of which a metal film is made, a thickness of the metal film and an excitation method.

Note that, in a case where a metal material and thickness are changed so that the propagation length in the first metal film 3 and the second metal film 4 does not become too short, the effective refractive indices of the first metal film 3 and the second metal film 4 also change. Therefore, it is desirable that the first metal film 3 and the second metal film 4 be arranged so that (i) the propagation length in the first metal film 3 and the second metal film 4 does not become too short and (ii) a surface plasmon polariton can change its propagation direction to a desired extent.

Figure 22:
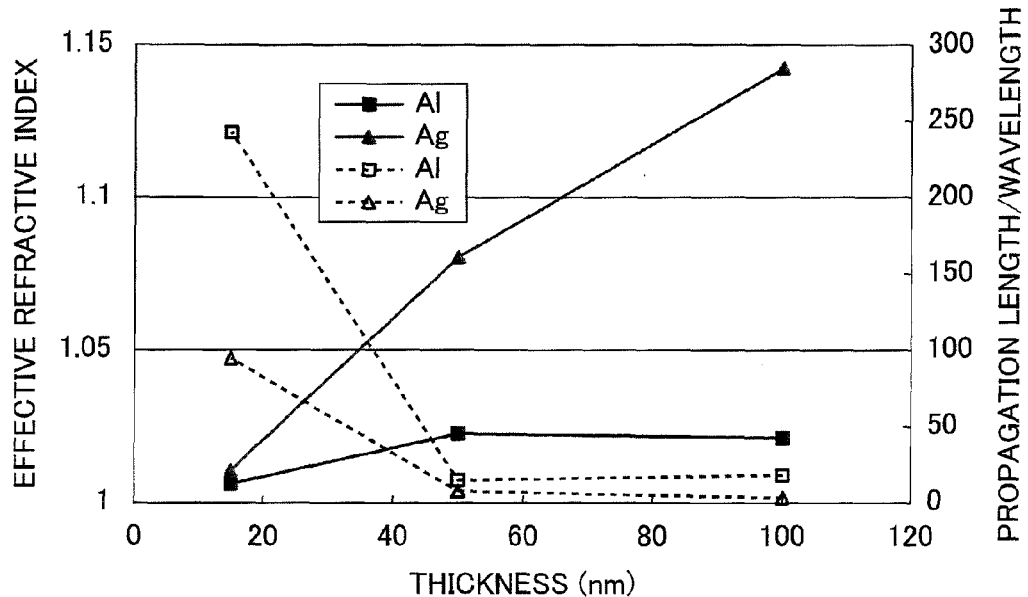
FIG. 22 is a graph showing how effective refractive index and propagation length are changed when thickness of a metal film is changed.

With reference to FIG. 22, the following description deals with how effective refractive index and propagation length of a metal film are changed in a case where a metal material and a thickness of the metal film are changed. FIG. 22 is a graph showing how (i) effective refractive index and propagation length of a metal film made of Al and (ii) effective refractive index and propagation length of a metal film made of Ag are changed when thicknesses of the metal films are changed.

In FIG. 22, a simulation is carried out under the condition that (i) each of the metal film made of Al and the metal film made of Ag is exposed to the air on both surfaces, (ii) the surface plasmon polariton 5, which has a frequency of $7.5 \times 10^{14}$ Hz and is in a symmetric mode, is propagated. In FIG. 22, the solid lines indicate effective refractive indices of the metal films, and the dotted lines indicate how much larger propagation length the surface plasmon polariton 5 has in the metal films than a wavelength of the surface plasmon polariton 5.

FIG. 22 shows that each of the metal film made of Al and the metal film made of Ag has a larger effective refractive index and a shorter propagation length, as its thickness increases. Further, in a case where the thickness is changed, the change in propagation length and effective refractive index in the metal film which is made of Al is different from that in the metal film which is made of Ag.

Like this, in a case where thicknesses of metal films which are made of different metal materials are changed, the change in propagation length and effective refractive index in one metal film is different from that in another metal film. Therefore, it is desirable that metal materials of which the first metal film 3 and the second metal film 4 are made and thicknesses of the first metal film 3 and the second metal film 4 are decided by taking into consideration (i) the fact that a metal film has propagation length and effective refractive index which vary depending on the metal material of which the metal film is made and the thickness of the metal film and (ii) the fact that the change in propagation length and effective refractive index of the metal film due to a change in thickness of the metal film varies depending on the material of which the metal film is made.

Figure 16:
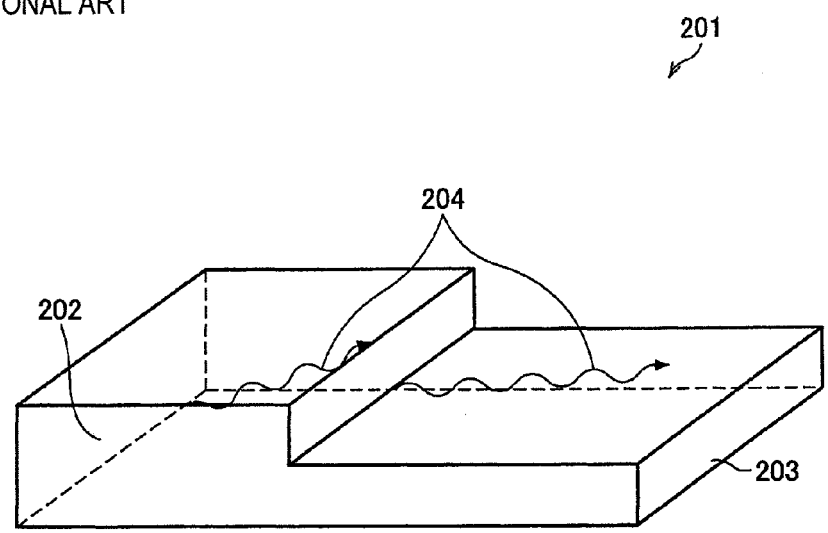
FIG. 16 is a perspective view schematically illustrating an arrangement of a conventional metal film for causing a surface plasmon polariton wave to be propagated and refracted, the metal film having two kinds of thickness.
Figure 17:
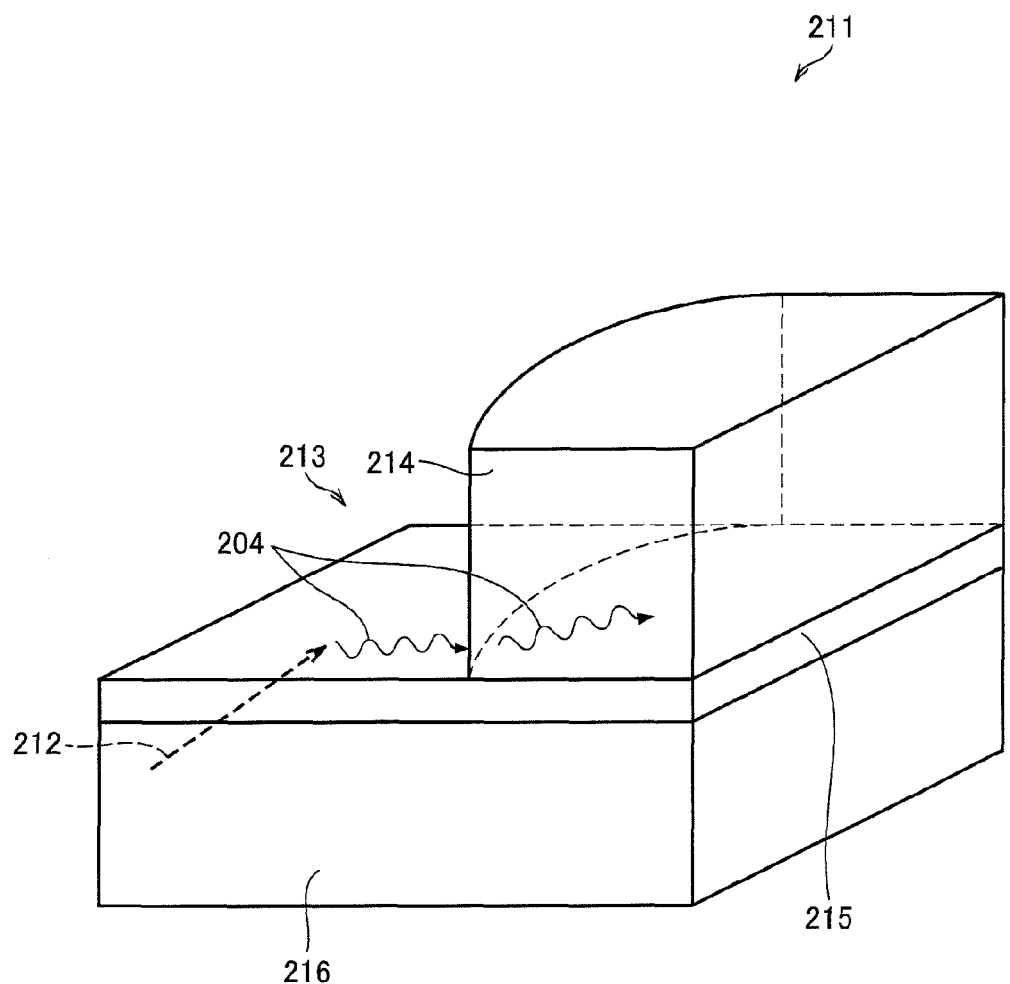
FIG. 17 is a perspective view illustrating a surface plasmon lens for collecting surface plasmon polaritons.

The following description deals with an advantage of the surface plasmon polariton direction change device 1 of the present embodiment over the metal film 201 shown in FIG. 16. According to the metal film 201 shown in FIG. 16, the first metal film 202 and the second metal film 203 have different thicknesses so as to have different effective refractive indices. In contrast, according to the present invention, the first metal film 3 and the second metal film 4 have the same thickness and are made of different metal materials so as to have different effective refractive indices.

FIG. 22 shows that an effective refractive index ratio between the first metal film 202 and the second metal film 203 is 1.13, in a case where the metal film 201 shown in FIG. 16 is arranged, for example, such that (i) each of the first metal film 202 and the second metal film 203 is made of Ag, (ii) a thickness of the first metal film 13 is set to 100 nm, and (iii) a thickness of the second metal film 14 is set to 20 nm.

On the other hand, FIG. 22 shows that, in a case where the first metal film 3 and the second metal film 4 are made of different materials like the surface plasmon polariton direction change device 1 of the present embodiment and have the same thickness, the effective refractive index ratio between the first metal film 3 and the second metal film 4 is 1.12, for example, under the condition that the first metal film 3 is made of Al, (ii) the second metal film 4 is made of Ag, and (iii) a thickness of each of the metal films is set to 100 nm.

Therefore, the effective refractive index ratio between the first metal film 3 and the second metal film 4 in the surface plasmon polariton direction change device 1 of the present embodiment can be made to be substantially the same as the effective refractive index ratio between the first metal film 202 and the second metal film 203 in the metal film 201. According to the surface plasmon polariton direction change device 1, it is not necessary that the first metal film 3 and the second metal film 4 have different thicknesses.

Figure 23:
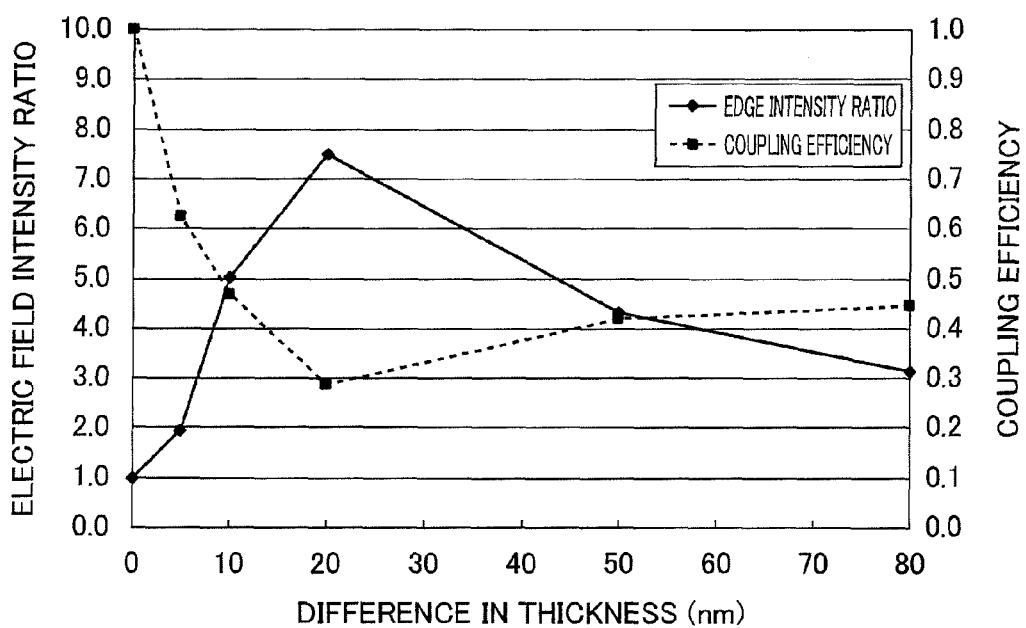
FIG. 23 is a graph showing how much (i) edge intensity ratio and (ii) coupling efficiency at an edge depend on a difference in thickness when a surface plasmon polariton is propagated on metal films which are different in thickness.

With reference to FIG. 23, the following description deals with scattering of the surface plasmon polariton 5, the scattering being caused by an edge of the first metal film 202 of the metal film 201 shown in FIG. 16. FIG. 23 is a graph showing edge intensity ratio and coupling efficiency at the edge of the first metal film 202 which are obtained when the surface plasmon polariton 5 is propagated from the first metal film 202 toward the second metal film 203 under the condition that (i) each of the first metal film 202 and the second metal film 203 is made of Ag, (ii) the first metal film 202 has a thickness of 100 nm, and (iii) the second metal film 203 is has a thickness of not more than 100 nm, and (iv) the surface plasmon polariton 5 has a frequency of $7.5 \times 10^{14}$ Hz and is in a symmetric mode.

The edge intensity ratio is indicated by the solid line in FIG. 23. The edge intensity ratio is defined as a ratio between (i) electric field intensity at the edge of the first metal film 202 and (ii) electric field intensity at a boundary between the first metal film 202 and the second metal film 203 in a case where the first metal film 202 and the second metal film 203 have the same thickness.

Further, the coupling efficiency is indicated by the dotted line in FIG. 23. The coupling efficiency is defined as a ratio between (i) electric field intensity obtained after the surface plasmon polariton 5 has passed through the edge of the first metal film 202 and (ii) electric field intensity obtained after the surface plasmon polariton 5 has passed through the boundary between the first metal film 202 and the second metal film 203 in a case where the first metal film 202 and the second metal film 203 have the same thickness.

As shown in FIG. 23, the edge intensity ratio becomes maximum when a difference in thickness between the first metal film 202 and the second metal film 203 is approximately 20 nm. When the difference in thickness is other than 20 nm, the smaller or the larger the difference in thickness becomes, the smaller the edge intensity ratio becomes. Thus, an amount of scattering of the surface plasmon polariton 5 at the edge of the first metal film 202 becomes maximum when the difference in thickness between the first metal film 202 and the second metal film 203 is a predetermined one. The amount of scattering of the surface plasmon polariton 5 at the edge of the first metal film 202 varies depending on the wavelength of the surface plasmon polariton 5 or the materials of which the first metal film 202 and the second metal film 203 are made respectively.

Further, the coupling efficiency has a tendency reverse to the edge intensity ratio because the surface plasmon polariton 5 which entered into the edge of the first metal Film 202 is scattered at the edge and loses its energy. That is, the coupling efficiency becomes minimum when a difference in thickness between the first metal film 202 and the second metal film 203 is approximately 20 nm. When the difference in thickness is other than 20 nm, the smaller or the larger the difference in thickness becomes, the larger the coupling efficiency becomes. Therefore, in a case where (i) each of the first metal film 202 and the second metal film 203 of the metal film 201 is made of Ag, (ii) the first metal film 202 has a thickness of 100 nm, and (iii) the second metal film 203 has a thickness of 20 nm (i.e. difference in thickness is 80 nm), then (a) the surface plasmon polariton 5 is scattered, 3.1 times the intensity of the surface plasmon polariton propagating on the first metal film 202, at the edge of the first metal film 202 and (b) the coupling efficiency becomes 0.45 (see FIG. 23).

As described above, the arrangement of the metal film 201 shown in FIG. 16 causes a large increase in scattering of the surface plasmon polariton 5 at the edge of the first metal film 202. As such, there occurs a deterioration in intensity of the surface plasmon polariton 5 which can be utilized. In view of this, it is preferable to provide an arrangement in which there is no difference in thickness between the first metal film 3 and the second metal film 4, like the surface plasmon polariton direction change device 1 of the present embodiment. As described above, even if the first metal film 3 and the second metal film 4 have the same thickness, it is possible to provide a difference in effective refractive index between the first metal film 3 and the second metal film 4, provided that the first metal film 3 and the second metal film 4 are made of different materials. Further, as shown in FIG. 23, in a case where the first metal film 3 and the second metal film 4 have the same thickness, the surface plasmon polariton 5 can be propagated instead of being scattered at the boundary between the first metal film 3 and the second metal film 4.

Materials of which the first metal film 3 and the second metal film 4 are made are not limited, provided that the surface plasmon polariton 5 can be propagated. It is preferable that metal having high electric conductivity be employed in light of the long propagation length. Aluminum (Al), copper (Cu), chromium (Cr), or noble metal such as gold (Au), silver (Ag) or platinum (Pt) is suitably used as the first metal film 3 or the second metal film 4.

Figure 2:
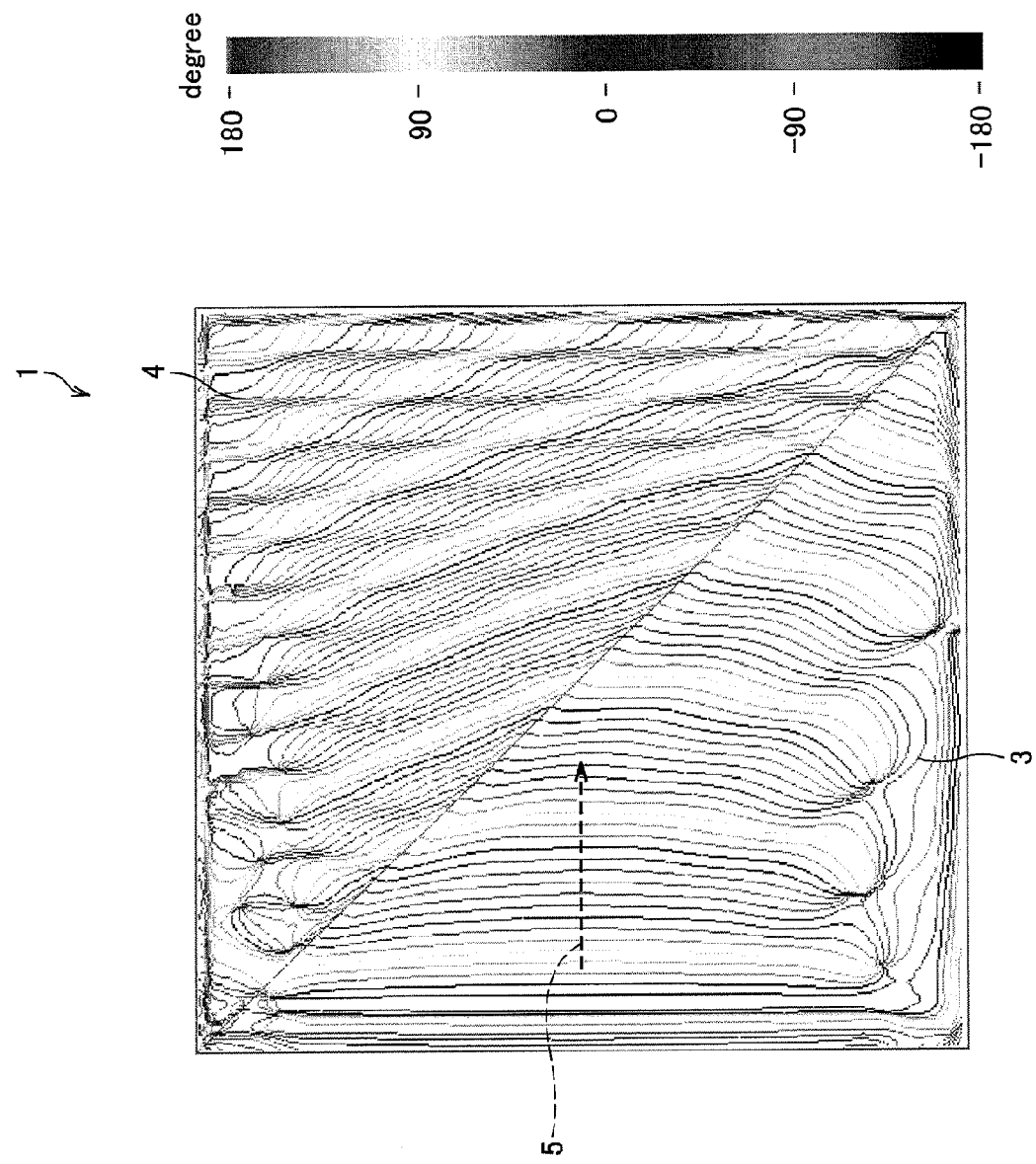
FIG. 2 is a view illustrating a phase distribution of a surface plasmon polariton on surfaces of the first metal film and the second metal film of the surface plasmon polariton direction change device.

Here, the change of a propagation direction of the surface plasmon polariton 5 in the surface plasmon polariton direction change device 1 of the present embodiment is confirmed by means of a simulation using a FDTD method (finite-difference time-domain method) with reference to FIG. 2. FIG. 2 is a view illustrating a phase distribution of the surface plasmon polariton 5 on surfaces of the first metal film 3 and the second metal film 4, respectively, which surfaces are opposite to surfaces in contact with the metal film support member 2 in the surface plasmon polariton direction change device 1.

A surface plasmon polariton direction change device 1 used in the FDTD method is arranged such that a first metal film 3 and a second metal film 4 have a thickness of 10 nm and are made of Al and Ag, respectively. A surface plasmon polariton 5 is propagated from the first metal film 3 toward the second metal film 4 at an incident angle of 45°. As a result, as is clear from a direction of a wavefront shown in FIG. 2, it was confirmed that the surface plasmon polariton 5 was refracted at the boundary between the first metal film 3 and the second metal film 4. That is, it was confirmed that the propagation direction of the surface plasmon polariton 5 was changed. In this case, an effective refractive index corresponds to a case where the surface plasmon polariton 5 is excited with the use of the Otto configuration (later described).

Figure 3:
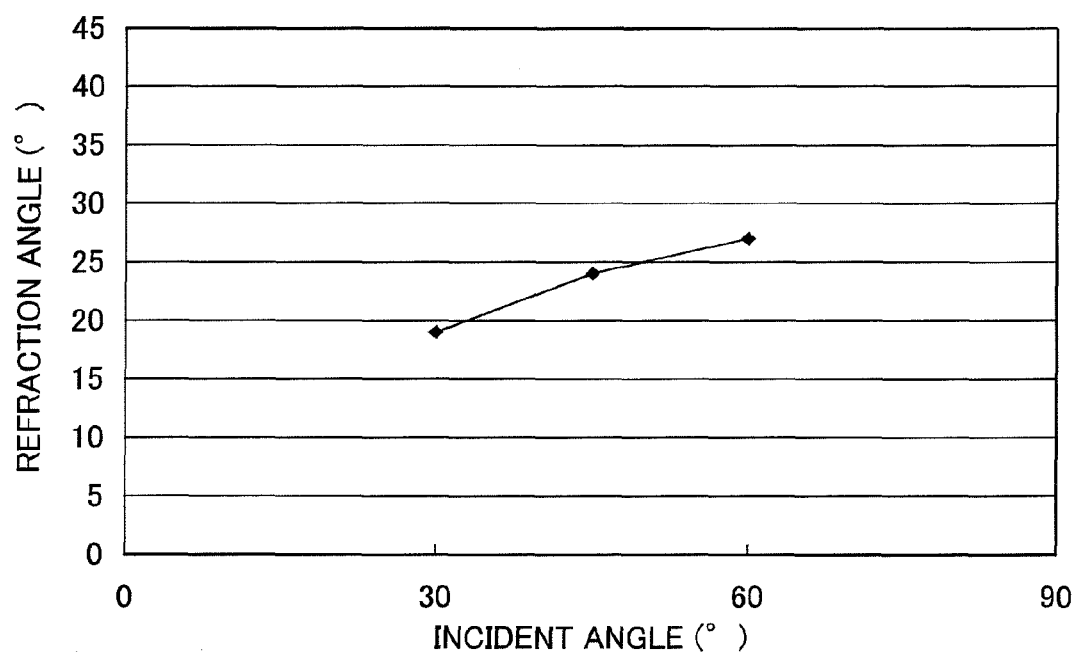
FIG. 3 is a graph showing a relationship between the incident angle and the refraction angle of the surface plasmon polariton in the surface plasmon polariton direction change device.
Figure 4:
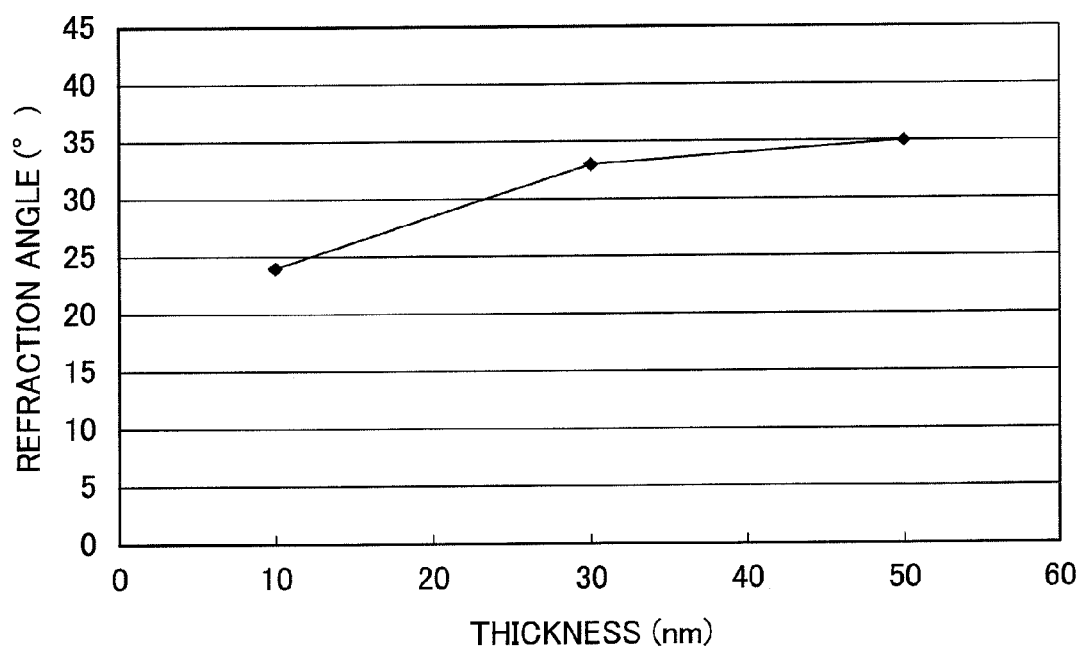
FIG. 4 is a graph showing a relationship between (i) the refraction angle of the surface plasmon polariton and (ii) thickness of the first metal film and the second metal film, in the surface plasmon polariton direction change device.

With reference to FIGS. 3 and 4, the following description deals with a relationship between (i) an incident angle and (ii) a refraction angle to the first metal film 3 and the second metal film 4 in the surface plasmon polariton direction change device 1. FIG. 3 is a graph showing a relationship between an incident angle and a refraction angle of the surface plasmon polariton 5 in the surface plasmon polariton direction change device 1. FIG. 4 is a graph showing a relationship between (i) a refraction angle of the surface plasmon polariton 5 and (ii) a respective thickness of the first metal film 3 and the second metal film 4 in the surface plasmon polariton direction change device 1. Note in FIG. 4 that (i) the incident angle of the surface plasmon polariton 5 with respect to the boundary between the first metal film 3 and the second metal film 4 is set to 45°, (ii) the first metal film 3 and the second metal film 4 are made of Al and Ag, respectively, and (iii) the first metal film 3 and the second metal film 4 have the same thickness.

As shown in FIG. 3, the larger the incident angle of the surface plasmon polariton 5 with respect to the boundary between the first metal film 3 and the second metal film 4 becomes, the larger the refraction angle, at which the surface plasmon polariton 5 is outputted from the boundary toward the second metal film 4, becomes.

As shown in FIG. 4, an increase in each thickness of the first metal film 3 and the second metal film 4 causes a change in each effective refractive index of the first metal film 3 and the second metal film 4. This makes it harder for the surface plasmon polariton 5 to be refracted.

Further, it was checked how the refractive angle at the boundary between the first metal film 3 and the second metal film 4 changes when metal materials and thicknesses of the first metal film 3 and the second metal film 4 of the surface plasmon polariton direction change device 1 are changed (not shown).

First, in a case where the first metal film 3 is made of Al and has a thickness of 10 nm and the second metal film 4 is made of Cu and has a thickness of 10 nm, then a refraction angle at the boundary between the first metal film 3 and the second metal film 4 becomes approximately 17°.

Next, in a case where the first metal film 3 is made of Al and has a thickness of 10 nm and the second metal film 4 is made of Au and has a thickness of 10 nm, then a refraction angle at the boundary between the first metal film 3 and the second metal film 4 becomes approximately 19°.

Here, the first metal film 3 is made of Al in both of the cases. However, it is easily predictable that a similar result corresponding to an effective refractive index ratio will be obtained even if the first metal film 3 is made of another material. It is also easily predictable that a similar result corresponding to an effective refractive index ratio will be obtained even if the first metal film 3 and the second metal film 4 are provided on a substrate.

Embodiment 2

Figure 5:
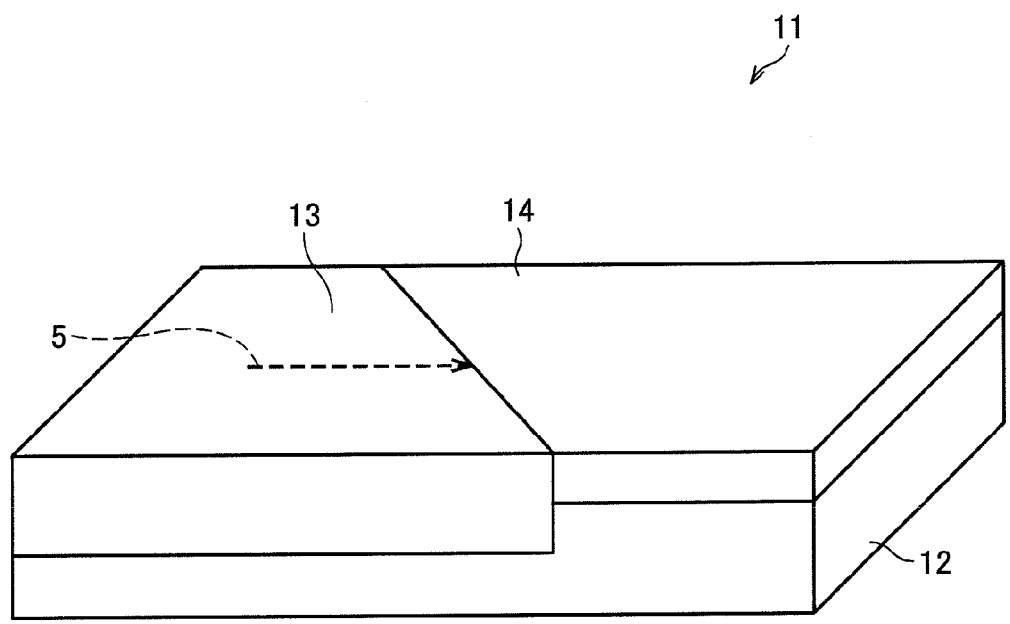
FIG. 5 is a plan view schematically illustrating an arrangement of a surface plasmon polariton direction change device of an Embodiment 2 of the present invention.

The following description deals with a surface plasmon polariton direction change device 11 of an Embodiment 2 of the present invention with reference to FIGS. 5, 6, 23 and 24. FIG. 5 is a perspective view schematically illustrating an arrangement of the surface plasmon polariton direction change device 11 of the Embodiment 2 of the present invention. Constituents which have similar functions to those of the surface plasmon polariton direction change device 1 of the Embodiment 1 are given identical reference numerals.

In the surface plasmon polariton direction change device 1 of the Embodiment 1 of the present invention, the first metal film 3 and the second metal film 4 are made of different materials so as to have different effective refractive indices. As described above, an effective refractive index of a metal film varies depending on (i) a mode of a surface plasmon polariton 5, (ii) a thickness of the metal film, (iii) a material of which the metal film is made and (iv) a refractive index of a medium with which the metal film is in contact. In view of this, the present embodiment deals with an arrangement in which a first metal film and a second metal film have different thicknesses so that effective refractive indices of the first metal film and the second metal film are adjusted.

As shown in FIG. 5, the surface plasmon polariton direction change device 11 includes a metal film support member 12, a first metal film 13 and a second metal film 14.

The first metal film 13 and the second metal film 14 are provided so as to be in contact with each other on a surface of the metal film support member 12 which has a plate shape and has predetermined thicknesses. The first metal film 13 and the second metal film 14 are arranged such that (i) the first metal film 13 has a thickness larger than the second metal film 14, (ii) a surface of the first metal film 13 which surface is opposite to a surface in contact with the metal film support member 12 (surface on which the arrow is illustrated in FIG. 5) is flush with a surface of the second metal film 14 which surface is opposite to a surface in contact with the metal film support member 12.

That is, the metal film support member 12 has two different thicknesses, i.e., a first thickness in an area on which the first metal film 13 is provided and a second thickness in an area on which the second metal film 14 is provided. In FIG. 5, the metal film support member 12 is depicted as a plate having predetermined thicknesses. However, the present invention is not limited to this. That is, the metal film support member 12 is not limited to a specific shape and a specific arrangement, provided that the metal film support member 12 is arranged so that the surface of the first metal film 13 which surface is opposite to the surface in contact with the metal film support member 12 is flush with the surface of the second metal film 14 which surface is opposite to the surface in contact with the metal film support member 12. A material of which the metal film support member 12 is made is identical to that of the metal film support member 2 of the Embodiment 1, and therefore is not explained repeatedly.

As described above, the first metal film 13 and the second metal film 14 have different thicknesses so that a difference can be produced in effective refractive index between the first metal film 13 and the second metal film 14. This makes it possible to adjust the effective refractive indices only by employing a single type of metal material and changing the thicknesses of such a single type of meta material.

FIG. 5 shows a case where the surface plasmon polariton direction change device 11 has a rectangular shape. However, the present invention is not limited to this. That is, a shape of the surface plasmon polariton direction change device 11 is not limited, provided that (i) metal films which are different in thickness are in contact with each other and (ii) surfaces of the metal films which are opposite to surfaces in contact with the metal film support member 12 are flush with each other.

Further, a boundary between the first metal film 13 and the second metal film 14 is provided so that an incident angle θ1 satisfies 0°<θ1<90° in a case where the surface plasmon polariton 5 is propagated from the first metal film 13 toward the boundary between the first metal film 13 and the second metal film 14.

Figure 6:
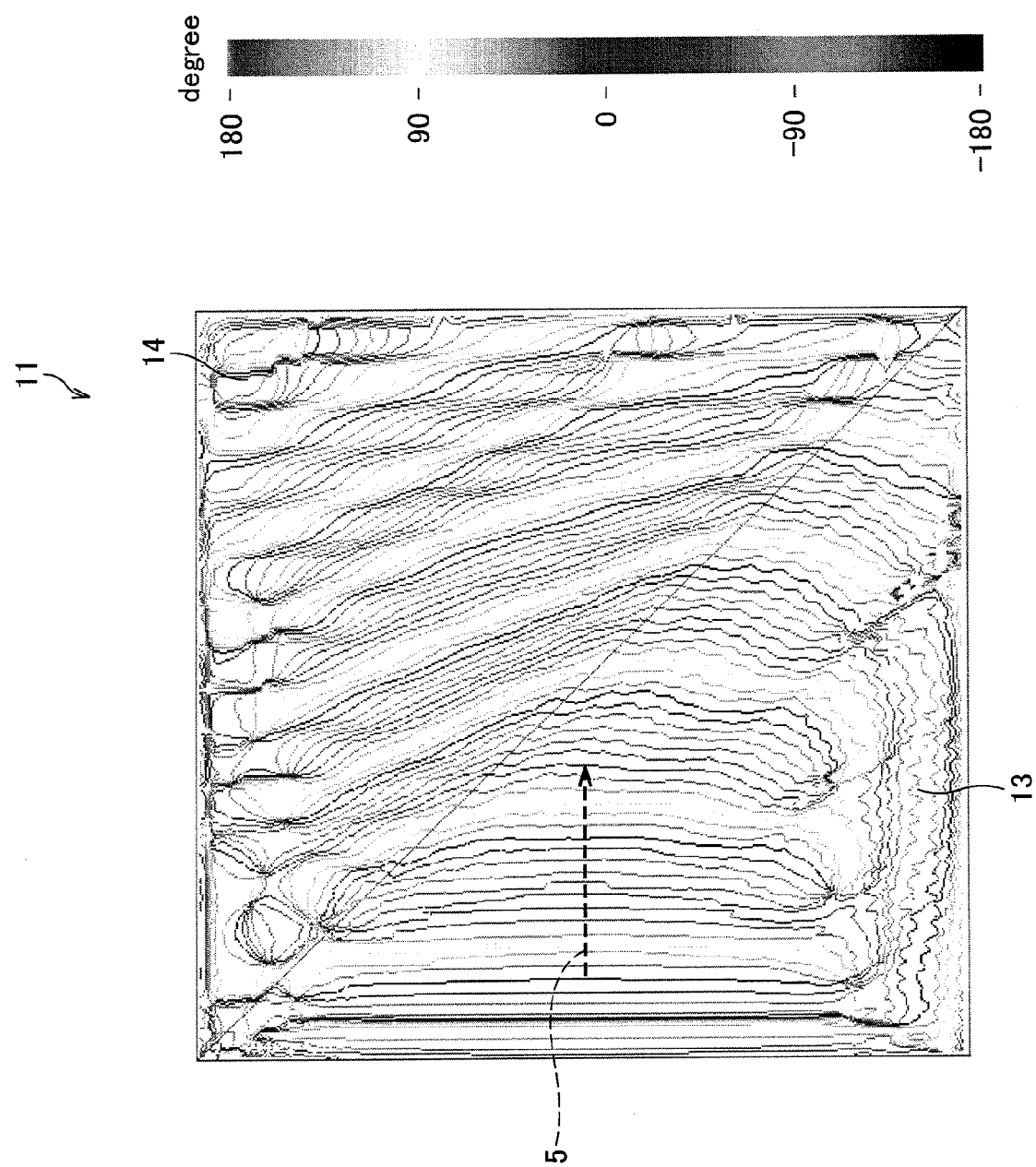
FIG. 6 is a view illustrating a phase distribution of a surface plasmon polariton on surfaces of the first metal film and the second metal film of the surface plasmon polariton direction change device.

Here, the change of a propagation direction of the surface plasmon polariton 5 in the surface plasmon polariton direction change device 11 of the present embodiment is confirmed by means of a simulation using a FDTD method (finite-difference time-domain method) with reference to FIG. 6. FIG. 6 is a view illustrating a phase distribution of the surface plasmon polariton 5 on the surfaces of the first metal film 13 and the second metal film 14, respectively, which surfaces are opposite to surfaces in contact with the metal film support member 12 in the surface plasmon polariton direction change device 11.

A surface plasmon polariton direction change device 11 used in the FDTD method is arranged such that a first metal film 13 and a second metal film 14 are made of Ag. Further, the first metal film 13 has a thickness of 50 nm and the second metal film 14 has a thickness of 10 nm. A surface plasmon polariton 5 is propagated from the first metal film 13 toward the second metal film 14 at an incident angle of 45°. As a result, as is clear from a direction of a wavefront shown in FIG. 6, it was confirmed that the surface plasmon polariton 5 was refracted at the boundary between the first metal film 13 and the second metal film 14. That is, it was confirmed that the propagation direction of the surface plasmon polariton 5 was changed.

However, the first metal film 13 is thicker than the second metal film 14. Therefore, an edge having the thickness of the first metal film 13 is generated, and the surface plasmon polariton 5 is partially scattered and becomes propagation light. Therefore, the phase distribution shown in FIG. 6 becomes is disordered, as compared with the phase distribution of FIG. 2 in which propagation of the surface plasmon polariton 5 in the surface plasmon polariton direction change device 1 of the Embodiment 1 is shown. The present embodiment deals with an arrangement in which the first metal film 13 has the thickness larger than the second metal film 14. However, it can be easily predictable that a similar result corresponding to an effective refractive index ratio will be obtained even if the second metal film 14 has the thickness larger than the first metal film 13.

However, the surface plasmon polariton direction change device 11 of the present embodiment is arranged such that the surface of the first metal film 13 which is opposite to the surface in contact with the metal film support member 12 is flush with the surface of the second metal film 14 which is opposite to the surface in contact with the metal film support member 12. As such, in a case where the surface plasmon polariton direction change device 11 is applied to a laser-assisted magnetic recording apparatus, it is not likely that a change in structure, such as dulling of an edge, occurs when the edge collides with the magnetic recording medium, even if the surface on which the surface plasmon polariton 5 is propagated faces a magnetic recording medium. This allows a reduction in probability of changing over time. Further, of surfaces on which the surface plasmon polariton 5 is propagated, there is no edge on a propagation surface opposite to a surface in contact with the metal film support member 12. On this account, the surface plasmon polariton 5 is not likely to be scattered on such a propagation surface. This causes little influence of a background noise due to scattered light. Further, of the surfaces on which the surface plasmon polariton 5 is propagated, the surface which is opposite to the surface in contact with the metal film support member 12 has no concavity and convexity. As such, it is easy to provide an element having another function on the propagation surface.

Figure 24:
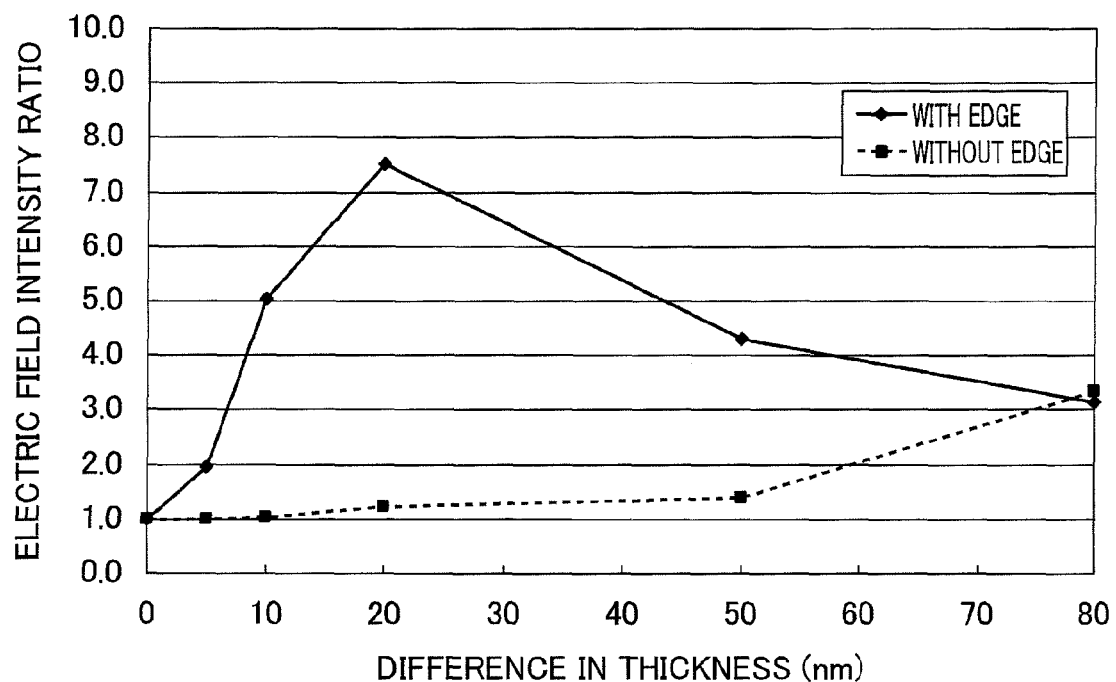
FIG. 24 is a graph showing how much (i) electric field intensity ratio at an edge and (ii) electric field intensity ratio on a flush surface in which surfaces of adjacent metal films are flush with each other depend on a difference in thickness when a surface plasmon polariton is propagated on metal films which are different in thickness.

With reference to FIG. 24, the following description deals with how the surface plasmon polariton 5 is scattered, on (i) an edge surface of the first metal film 13 on a side where the edge occurs and (ii) an opposite surface, which is flush with the second metal film 14, to the edge surface, at the boundary between the first metal film 13 and the second metal film 14. FIG. 24 is a graph showing an electric field intensity ratio, which is obtained when the surface plasmon polariton 5 is propagated, on the edge surface and on the opposite surface, from the first metal film 13 toward the second metal film 14 under the condition that (i) each of the first metal film 13 and the second metal film 14 is made of Ag, (ii) the first metal film 13 has a thickness of 100 nm, (iii) the second metal film 14 has a thickness of not more than 100 nm, and (iv) the surface plasmon polariton 5 has a frequency of $7.5 \times 10^{14}$ Hz and is in a symmetric mode. Note that the solid line shown in FIG. 24 indicates a ratio on the edge surface between (i) an electric field intensity at the edge of the first metal film 13 and (ii) an electric field intensity obtained when there is no difference in thickness between the first metal film 13 and the second metal film 14. Further, the dotted line shown in FIG. 24 indicates a ratio on the opposite surface between (i) an electric field intensity at the edge of the first metal film 13 and (ii) an electric field intensity obtained when there is no difference in thickness between the first metal film 13 and the second metal film 14.

As shown in FIG. 24, on the edge surface, when the difference in thickness between the first metal film 13 and the second metal film 14 is approximately 20 nm, the electric field intensity ratio becomes approximately 7.5. This causes the surface plasmon polariton 5 to be scattered in large amounts at the edge of the first metal film 13. On the other hand, on the opposite surface, the electric field intensity ratio remains substantially constant, provided that the difference in thickness between the first metal film 13 and the second metal film 14 is not more than 50 nm. That is, on the flush surface, the surface plasmon polariton 5 is hardly affected by the scattering due to the edge of the first metal film 13 and therefore scattered light is hardly generated, provided that the difference in thickness between the first metal film 13 and the second metal film 14 is not more than 50 nm.

Further, a dielectric film which has the thickness equal to the difference in thickness between the first metal film 13 and the second metal film 14 can be provided on the edge surface of the surface plasmon polariton direction change device 11. In this case, the surface plasmon polariton 5 is scattered at the edge but a collision of the first metal film 13 with a medium can be avoided. As such, it becomes easy to provide another element.

The present embodiment deals with a case in which the first metal film 13 and the second metal film 14 are made of the same metal material. However, it is easily predictable that effective refractive indices similar to those shown in FIG. 22 are obtained and a similar result corresponding to an effective refractive index ratio will be obtained, even if the first metal film 13 and the second metal film 14 are made of different materials, like the surface plasmon polariton direction change device 1 of the Embodiment 1 in which the first metal film 3 and the second metal film 4 are made of different materials.

Embodiment 3

Figure 7:
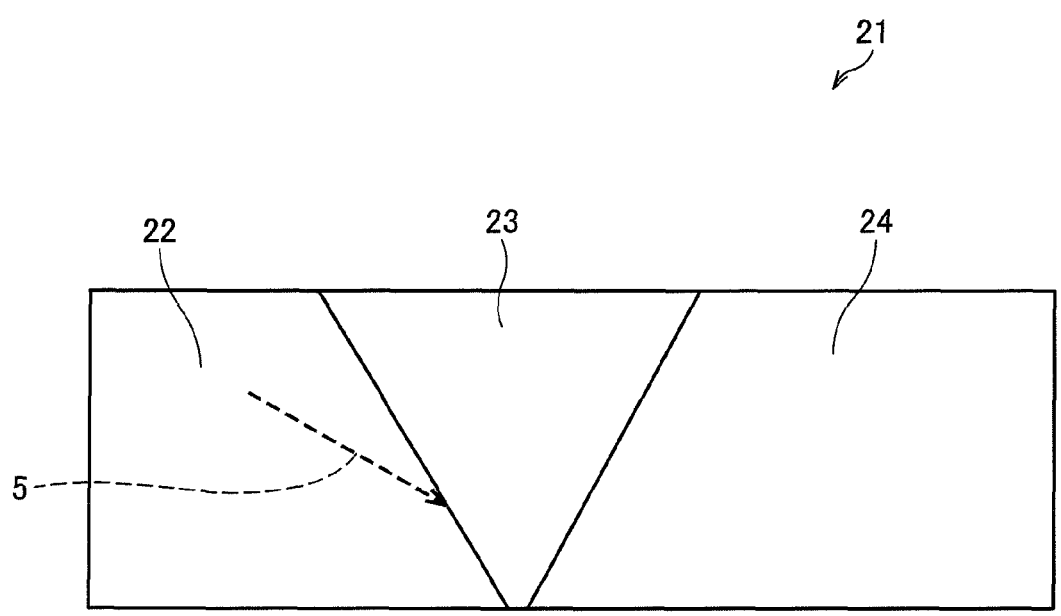
FIG. 7 is a plan view schematically illustrating an arrangement of a magnetic field generating element of an Embodiment 3 of the present invention.

The following description deals with a surface plasmon polariton direction change device 21 of an Embodiment 3 of the present invention with reference to FIG. 7. FIG. 7 is a plan view schematically illustrating an arrangement of the surface plasmon polariton direction change device 21 of the Embodiment 3 of the present invention. Constituents which have similar functions to those of the surface plasmon polariton direction change device 1 of the Embodiment 1 are given identical reference numerals.

As shown in FIG. 7, the surface plasmon polariton direction change device 21 includes a first metal film 22, a second metal film 23 and a third metal film 24. Each of the first metal film 22, the second metal film 23 and the third metal film 24 is formed on a surface of a metal film support member 2 (not shown).

The first metal film 22, the second metal film 23 and the third metal film 24 are in contact with each other in this order, and have the same thickness. Further, the first metal film 22 and the second metal film 23 have different effective refractive indices because they are made of different materials, respectively, although the first metal film 22 and the second metal film 23 have the same thickness. Note that the first metal film 22 and the third metal film 24 can have different effective refractive indices. Alternatively, the first metal film 22 and the third metal film 24 can have the same effective refractive index. In a case where the first metal film 22 and the third metal film 24 have different effective refractive indices, it is possible to more flexibly design a refraction angle. On the other hand, it is possible to reduce the number of manufacturing steps, in a case where the first metal film 22 and the third metal film 24 have the same effective refractive index, i.e., in a case where the first metal film 22 and the third metal film 24 are made of the same metal material and have the same thickness.

In FIG. 7, the surface plasmon polariton direction change device 21 has a rectangular shape. However, the present embodiment is not limited to this. Further, the present embodiment deals with a case in which (i) the first metal film 22, the second metal film 23 and the third metal film 24 have the same thickness and (ii) the metal materials of which the metal films 22 through 24 are made are different from one another so that the metal films 22 through 24 have different effective refractive indices. However, the present invention is not limited to this. It is possible that the metal films 22 through 24 can be made of the same metal material and have different thicknesses so that the metal films 22 through 24 have different effective refractive indices. Alternatively, it is possible that the metal films 22 through 24 are made of different metal materials and have different thicknesses so that the metal films 22 through 24 have different effective refractive indices.

That is, the surface plasmon polariton direction change device 21 is not limited to a specific shape, provided that (i) metal films having different effective refractive indices are adjacent to each other and (ii) surfaces of the adjacent metal films which are opposite to surfaces in contact with the metal film support member 2 are flush with one another.

Note also that the first metal film 22, the second metal film 23 and the third metal film 24 are formed so that a boundary between the first metal film 22 and the second metal film 23 is not parallel to a boundary between the second metal film 23 and the third metal film 24.

The boundary between the first metal film 22 and the second metal film 23 is provided so that an incident angle θ1 satisfies 0°<θ1<90° in a case where the surface plasmon polariton 5 is propagated from the first metal film 22 toward the boundary between the first metal film 22 and the second metal film 23. Further, the boundary between the second metal film 23 and the third metal film 24 is provided so that an incident angle θ1 satisfies 0°<θ1<90° (or −90°<θ1<0°) in a case where the surface plasmon polariton 5 is propagated from the second metal film 23 toward the boundary between the second metal film 23 and the third metal film 24.

Further, as has been described earlier, the intensity of the surface plasmon polariton 5 is attenuated as it propagates. Therefore, it is preferable in the surface plasmon polariton direction change device 21 that a propagation distance of the surface plasmon polariton 5 from the boundary between the first metal film 22 and the second metal film 23 to the boundary between the second metal film 23 and the third metal film 24 is shorter than a propagation length of the surface plasmon polariton 5.

The following description deals with how the surface plasmon polariton 5 changes its direction in the surface plasmon polariton direction change device 21 of the present embodiment.

The surface plasmon polariton 5 is excited in the first metal film 22 by a light source (not shown) in the surface plasmon polariton direction change device 21 of the present embodiment. Alternatively, the surface plasmon polariton 5 can be externally propagated to the first metal film 22. Then, the surface plasmon polariton 5 is propagated on a surface of the first metal film 22 and is refracted at the boundary between the first metal film 22 and the second metal film 23. Thereafter, the surface plasmon polariton 5 is propagated on a surface of the second metal film 23, and is then refracted at the boundary between the second metal film 23 and the third metal film 24.

Note that metal materials, thicknesses and the like of the first metal film 22, the second metal film 23 and the third metal film 24 are identical to those in the surface plasmon polariton direction change device 1 of the Embodiment 1, and therefore are not explained repeatedly.

Thus, in the surface plasmon polariton direction change devices of the Embodiments 1 through 3, a boundary is formed between adjacent two metal films. From a practical standpoint, it is difficult to realize no difference in thickness between the adjacent metal films during preparation of a surface plasmon polariton direction change device. An existing deposition apparatus has a margin of error of around ±5% of thickness although such a margin varies depending on the dimension of an area to be deposited. As such, in the Embodiments 1 through 3, the wording "same thickness" and the wording "flush with" include the margin of error of ±5% of thickness.

In FIG. 23, for example, in a case where each of the first metal film 13 and the second metal film 14 has a thickness of 100 nm, a difference in thickness between the first metal film 13 and the second metal film 14 is 5 nm. FIG. 23 shows that an edge intensity ratio becomes approximately 1.9 and a coupling efficiency becomes approximately 0.6. However, these values do not so much affect the scattering of the surface plasmon polariton 5. Further, concavity and convexity, which are referred to as a surface roughness, will occur on a surface of a metal film. The dimension of the concavity and convexity varies depending on (i) a material underneath the metal film, (ii) compatibility between a surface condition of the material underneath the metal film and a material of the metal film, and (iii) a thickness of the metal film. In a case where such a surface roughness exists, an average of thicknesses at several points of the metal film is regarded as the thickness of the metal film. Therefore, an average thickness ha is expressed as follows:

$$ha = \iint h(x,y)\,dx\,dy/S$$

where thickness at a point (x, y) is h(x, y) and the dimension of the metal film is S.

[Method for Manufacturing Surface Plasmon Polariton Direction Change Device]

Figure 8:
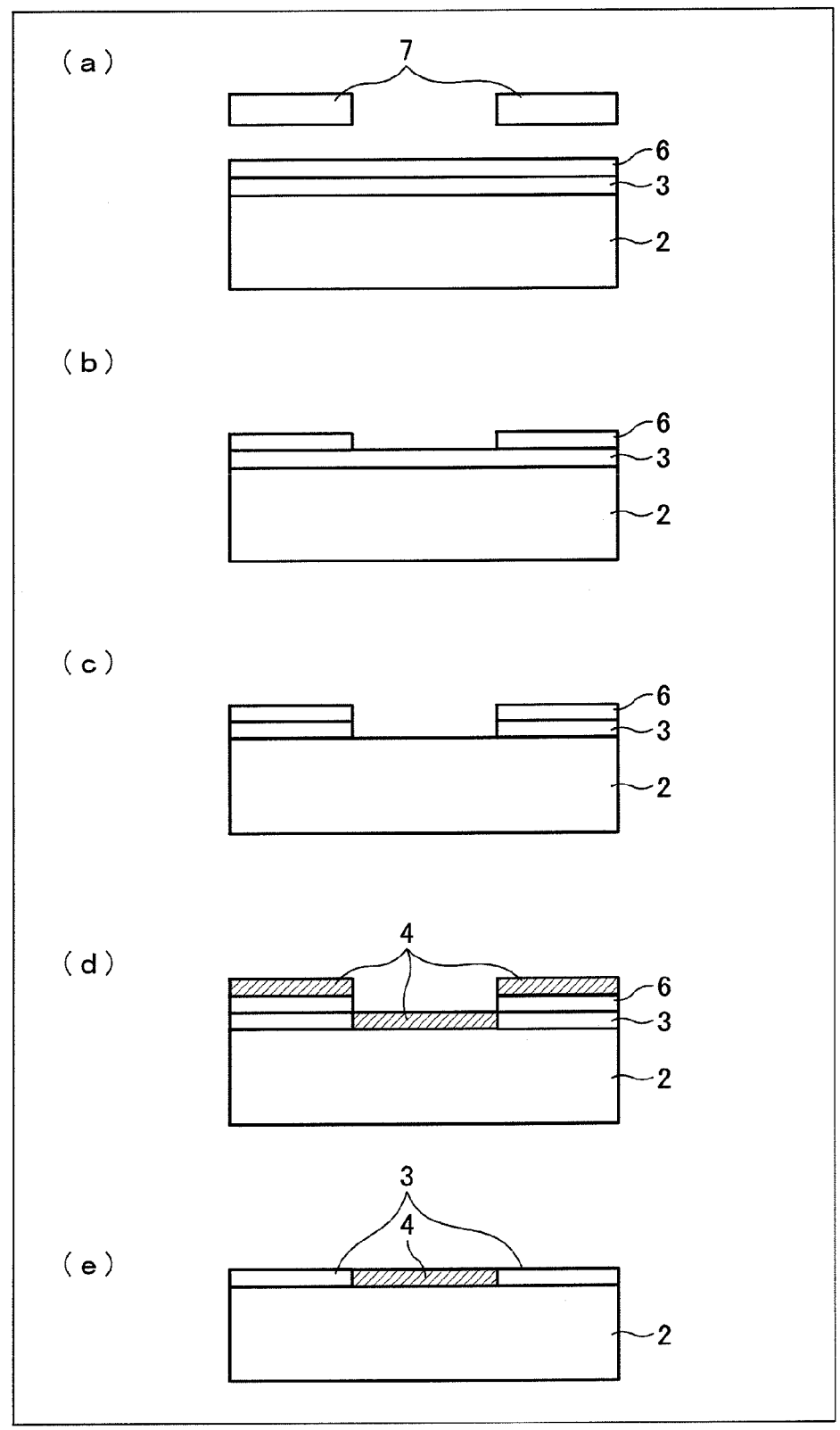
FIG. 8 is a cross-sectional view illustrating a method for manufacturing a surface plasmon polariton direction change device of the present invention.

The following description deals with a method for manufacturing a surface plasmon polariton direction change device of the present invention with reference to (a) through (e) of FIG. 8. (a) through (e) of FIG. 8 are cross-sectional views each illustrating a method for manufacturing a surface plasmon polariton direction change device of the present invention. The method for manufacturing a surface plasmon polariton direction change device of the present invention can be applied to the surface plasmon polariton direction change devices 1, 11 and 21. The following description deals with a method for manufacturing the surface plasmon polariton direction change device 1.

First, the first metal film 3 is deposited over the metal film support member 2 by sputtering or vapour deposition (see (a) of FIG. 8). Then, photoresist 6 is applied over the whole surface of the first metal film 3 by a spin coater or the like. At this moment, in a case where the photoresist 6 is positive type photoresist, the photoresist 6 is coated with a mask 7 except a part on which the second metal film 4 is to be formed. Note that the mask 7 can be provided so as to be away from the photoresist 6 (see (a) of FIG. 8). Alternatively, an exposure can be carried out with respect to the metal film support member 2 while the mask 7 and the photoresist 6 are in contact with each other. Alternatively, a shape of the mask 7 can be transferred onto the photoresist 6 without enlarging or reducing. Alternatively, the shape of the mask 7 can be transferred onto the photoresist 6 with reducing.

Next, the metal film support member 2 is subjected to exposure and developing in a state where the photoresist 6 is coated with the mask 7. This causes the part of the photoresist 6, which is not coated with the mask 7, to be removed (see (b) of FIG. 8).

Next, as shown in (c) of FIG. 8, a part of the first metal film 3 from which part the photoresist 6 is removed is etched and removed. That is, a part of the first metal film 3 on which part the second metal film 4 is to be formed is etched and removed. In this etching process, the part of the first metal film 3 which part is not coated with the photoresist 6 is entirely removed.

Next, as shown in (d) of FIG. 8, the second metal film 4 is deposited by sputtering or vapour deposition. Then, the photoresist 6 which was not removed due to the mask 7 is removed. As a result, as shown in (e) of FIG. 8, a structure in which the first metal film 3 and the second metal film 4 are adjacent to each other is obtained. If there is a burr on a surface of a metal film, the surface needs to be polished.

A wet etching process and a dry etching process such as ion etching and reactive ion etching (RIE) are used in a method for manufacturing a surface plasmon polariton direction change device.

An aligner or a stepper is used in the exposure process in the method for manufacturing the surface plasmon polariton direction change device 1. Further, an FIB (Focused ion beam) or a nanoimprinting process can be used instead of etching.

[Method for Exciting Surface Plasmon Polariton]

The following description deals with a method for exciting a surface plasmon polariton in a surface plasmon polariton direction change device of the present invention with reference to FIGS. 18 through 21. For ease of explanation, the following description deals with a case where a surface plasmon polariton excitation section including a substrate, a metal film and a dielectric layer is used instead of a surface plasmon polariton direction change device of the present invention. The substrate is not limited to a specific one, provided that the substrate is made of a material having light transmittance.

Generally, the following three methods (i.e. first through third excitation methods) are known for exciting a surface plasmon polariton in a surface plasmon polariton excitation section.

The first excitation method is a method for causing incident light to enter, at an appropriate angle from a substrate side, into a surface plasmon polariton excitation section including a substrate, a metal film and a dielectric layer.

An arrangement of a surface plasmon polariton excitation section using the first excitation method is classified into the Kretchmann configuration and the Otto configuration, depending on how the substrate, the metal film and the dielectric layer are provided. The following description deals with the Kretchmann configuration and the Otto configuration with reference to FIGS. 18 and 19, respectively.

Figure 18:
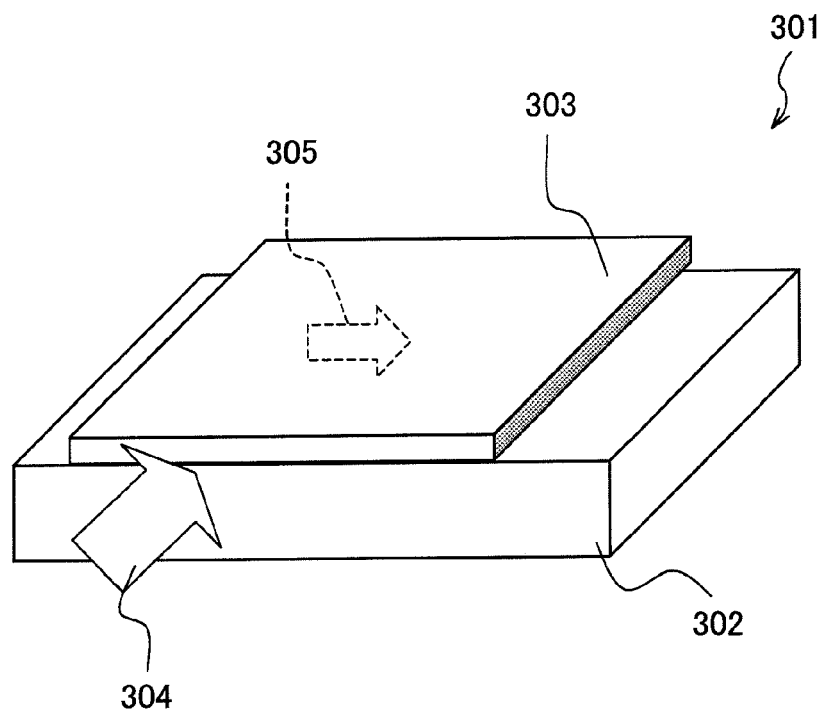
FIG. 18 is a perspective view illustrating a surface plasmon polariton excitation section which is arranged in a Kretchmann configuration.

FIG. 18 is a perspective view illustrating a surface plasmon polariton excitation section 301 arranged in conformity with the Kretchmann configuration. As shown in FIG. 18, in the Kretchmann configuration, a metal film 303 is provided on a transparent substrate 302. A surface of the metal film 303, which surface is opposite to a surface in contact with the transparent substrate 302 (a surface opposite to a surface on which light is incident), is in contact with a dielectric layer (which corresponds to air in the arrangement shown in FIG. 18) having a refractive index smaller than the transparent substrate 302. An incident light 304 is caused to enter, at an appropriate angle from a transparent substrate 302 side, into an interface between the transparent substrate 302 and the metal film 303, when a surface plasmon polariton is excited in the surface plasmon polariton excitation section 301. This causes a surface plasmon polariton resonance to be generated inside the metal film 303 (see the arrow 305 in FIG. 18). As a result, a surface plasmon polariton is generated as surface waves which are propagated in a direction which the vector component of a wave number vector of the incident light 304 which vector component is parallel to the metal film 303 (see arrow 305 in FIG. 18) on both surfaces of the metal film 303, i.e., (i) the surface which is in contact with the transparent substrate (surface into which light enters) and (ii) the surface which is opposite to the surface which is in contact with the transparent substrate.

Figure 19:
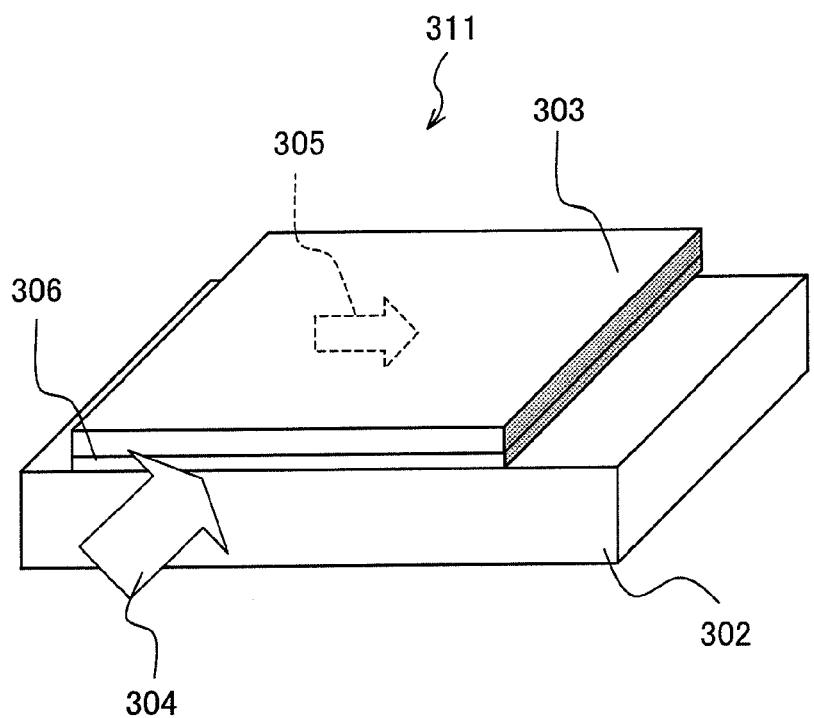
FIG. 19 is a perspective view illustrating a surface plasmon polariton excitation section which is arranged in an Otto configuration.

FIG. 19 is a perspective view illustrating a surface plasmon polariton excitation section 311 arranged in conformity with the Otto configuration. As shown in FIG. 19, in the Otto configuration, a dielectric layer 306 having refractive index smaller than the transparent substrate 302 is provided on the transparent substrate 302, and the metal film 303 is formed on the dielectric layer 306. The incident light 304 is caused to enter, at an appropriate angle, from a transparent substrate 302 side, into an interface between the transparent substrate 302 and the metal film 303 to the surface boundary when a surface plasmon polariton 305 is excited in the surface plasmon polariton excitation section 311. As a result, the surface plasmon polariton 305 is generated as surface waves which are propagated in a direction which the vector component of a wave number vector of the incident light 304 which vector component is parallel to the metal film 303, like the Kretchmann configuration. The Otto configuration is different from the Kretchmann configuration in that (i) the effective refractive index is higher and (ii) a surface plasmon polariton having a shorter propagation length is excited. Therefore, in a case where the surface plasmon polariton 305 is excited based on the Kretchmann configuration, a refraction angle at a boundary between adjacent metal films of a surface plasmon polariton direction change device of the present invention cannot be made so large, but a propagation length becomes sufficiently long after refraction. On the other hand, in a case where the surface plasmon polariton 305 is excited in the Otto configuration, a refraction angle at a boundary between adjacent metal films of a surface plasmon polariton direction change device of the present invention can be made large, but a propagation length becomes short after refraction.

According to the first excitation method, irrespective of the Kretchmann configuration and the Otto configuration, the surface plasmon polariton 305 can be excited most efficiently when the incident light 304 is polarized in a direction of p-polarization with respect to an interface between the transparent substrate 302 and the metal film 303.

Further, an incident angle of the incident light 304 with respect to the interface between the transparent substrate 302 and the metal film 303 is not limited to a specific one, provided that the surface plasmon polariton 305 can be excited. However, it is preferable that the incident angle of the incident light 304 is set so that energy of the incident light 304 is most efficiently converted into the surface plasmon polariton 305. That is, it is preferable that the incident angle is set so that reflectance of the incident light 304 with respect to the metal film 303 becomes minimum. Specifically, an optimal incident angle is approximately 45°, although it depends on materials of and from which the transparent substrate 302 and the metal film 303 are made, respectively. This incident angle brings about the highest light use efficiency. Further, the optimal incident angle is realized when the transparent substrate 302 itself is a prism or when the transparent substrate 302 is attached to a prism.

Figure 20:
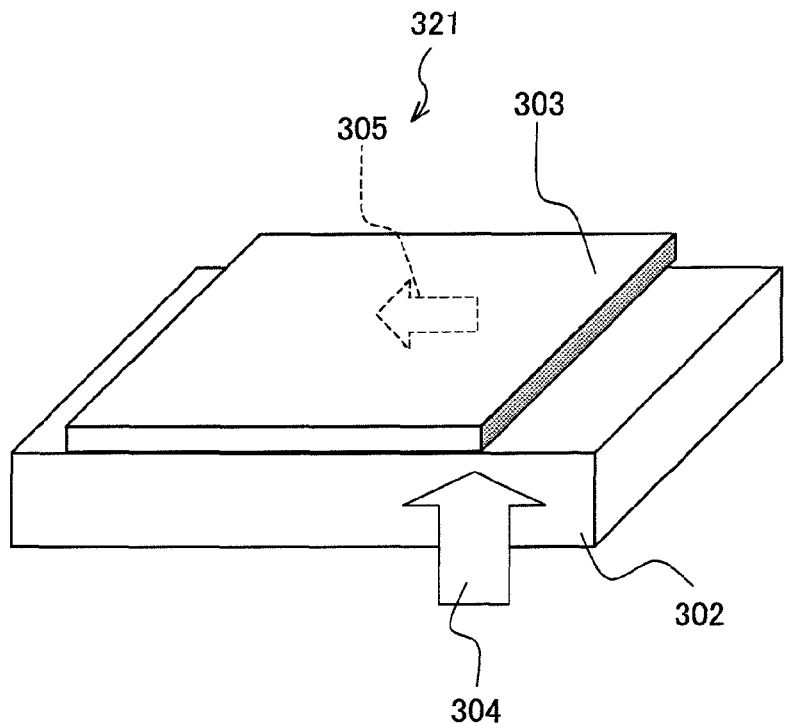
FIG. 20 is a perspective view illustrating a surface plasmon polariton excitation section using a second excitation method.

The following description deals with the second excitation method with reference to FIG. 20. FIG. 20 is a perspective view illustrating a surface plasmon polariton direction change device 321 using the second excitation method. As shown in FIG. 20, the second excitation method is a method for irradiating an edge of the metal film 303 with the incident light 304. In this method, it is possible to most efficiently excite the surface plasmon polariton 305 when the incident light is polarized perpendicularly to the edge. When the edge of the metal film 303 is irradiated by the light, free electrons at an edge section are vibrated due to an electric field of light. The vibration is conveyed to electrons on the surface of the metal film 303 one after another, thereby generating the surface plasmon polariton 305. The surface plasmon polariton 305 thus generated is directed in a direction almost perpendicular to the edge of the metal film 303.

According to the second excitation method, a surface plasmon polariton 305 can be excited as long as incident light has a component whose polarization direction is perpendicular to the edge. As such, this gives rise to greater flexibility in selecting refractive index of a metal material, thickness and the like.

The incident light 304 can be perpendicularly entered into the edge of the metal film 303. Alternatively, the incident light 304 can be entered into the edge at an appropriate angle to the surface boundary between the transparent substrate 302 and the metal film 303, i.e., at a suitable angle for generating a surface plasmon polariton.

In a case where the incident light 304 is perpendicularly entered into the metal film 303, the transparent substrate 302 can be a planar substrate. This allows (i) the metal film 303 to be easily designed, as compared with a case where a prism or the like is used as the transparent substrate 302, and (ii) a reduction in size. Furthermore, the easy assembling can be realized as the second excitation method has a larger tolerance for error in incident angle than the first excitation method. This allows a reduction in manufacturing time and cost.

On the other hand, in a case where the incident light 304 is entered into the surface boundary between the transparent substrate 302 and the metal film 303 at a suitable angle for exciting a surface plasmon polariton 305, (i) a surface plasmon polariton 305 is excited by the light entered into a part except the edge and (ii) in the edge section, a surface plasmon polariton 305 caused by the vibration of free electrons is excited. Therefore, this case has higher light use efficiency than a case where the surface plasmon polariton 305 is excited only in the edge section.

Further, when an opening or a slit (hereinafter referred to as opening section or the like) is provided in the metal film, it is possible to provide in a target position an edge, which serves as a section irradiated by the incident light in the second excitation method.

Figure 21:
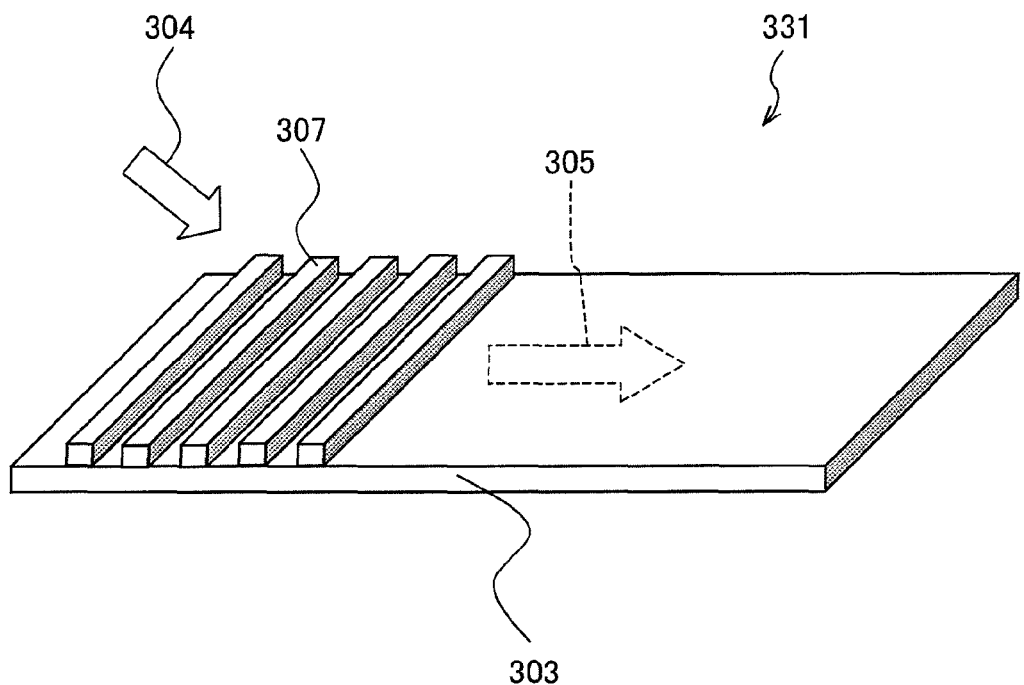
FIG. 21 is a perspective view illustrating a surface plasmon polariton excitation section using a third excitation method.

The following description deals with the third excitation method with reference to FIG. 21. FIG. 21 is a perspective view illustrating a surface plasmon polariton direction change device 331 using the third excitation method. As shown in FIG. 21, the third excitation method is a method for irradiating, at a suitable angle, a diffraction grating 307 of a metal film 303 with incident light 304. A surface plasmon polariton can be excited when the wave number of light diffracted by the diffraction grating 307 is equal to that of the surface plasmon polariton. An incident angle is not limited to a specific one, provided that the surface plasmon polariton 305 can be excited. However, a surface plasmon polariton 305 implies an energy conversion of the incident light 304. Therefore, it is preferable that the incident angle is set so that the energy of the incident light 304 is most efficiently converted into the surface plasmon polariton 305. That is, it is preferable that the incident angle is set so that reflectance of the incident light 304 with respect to the metal film 303 becomes minimum. The interval between gratings of the diffraction grating 307 varies depending on the incident angle and the wave number of a surface plasmon polariton but is equal to the wavelength of the incident light although.

Any one of the first excitation method, the second excitation method and the third excitation method can be used in a case where a surface plasmon polariton is generated in the following embodiments of a surface plasmon polariton direction change device of the present invention. Further, a substrate, a metal film and a dielectric layer can be arranged based on the Kretchmann configuration or on the Otto configuration.

Further, it is possible to improve the use efficiency of the incident light 304 by reducing an irradiation area of the incident light 304 with the use of a lens, a beam expander or the like. This is because the area irradiated by the incident light can be narrowed down so that a distance from a near-field light output section is not more than a propagation length of a surface plasmon polariton. In a case where the incident angle 304 is narrowed down by a lens, the incident light 304 includes light rays entered at various incident angles, respectively. It follows that the incident light 304 includes light rays which do not meet optimum conditions for exciting a surface plasmon polariton. However, because an irradiation area can be reduced, the following advantage is brought about. Specifically, the use efficiency of the incident light 304 can be improved and an area in which a surface plasmon polariton is generated can be decreased to a desired area.

[Laser-assisted Magnetic Recording Apparatus]

Figure 9:
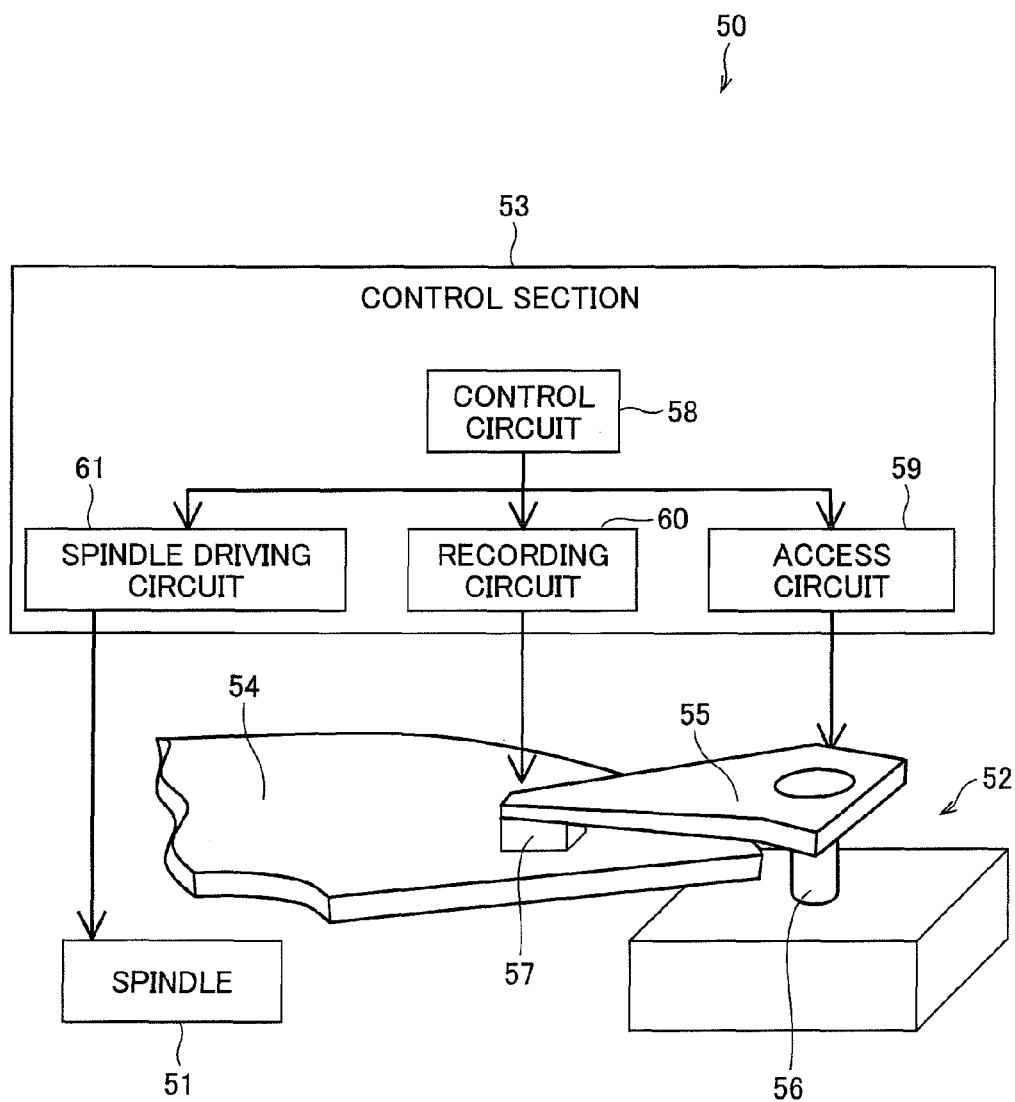
FIG. 9 is a perspective view illustrating a laser-assisted magnetic recording apparatus using a surface plasmon polariton direction change device of the present invention.

The following deals with a laser-assisted magnetic recording apparatus 50 for performing laser-assisted magnetic recording with the use of a surface plasmon polariton direction change device of the present invention with reference to FIG. 9. FIG. 9 is a perspective view illustrating the laser-assisted magnetic recording apparatus 50 using a surface plasmon polariton direction change device of the present invention.

As shown in FIG. 9, the laser-assisted magnetic recording apparatus 50 includes a spindle 51, a driving section 52 and a control section 53. The laser-assisted magnetic recording apparatus 50 records information on a magnetic recording medium 54 with the use of light and magnetism.

The spindle 51 corresponds to a spindle motor for rotating the magnetic recording medium 54.

The driving section 52 includes an arm 55, a rotational axis 56 and a slider section (read/write head) 57. The arm 55 causes the slider section 57 to move in a substantially radial direction of the magnetic recording medium 54 having a disc shape. The arm 55 serves as a section for supporting a swing arm structure. The arm 55 is supported by the rotary axis 56 so as to rotate upon the rotary axis 56. The slider section 57 causes the magnetic recording medium 54 to be irradiated by near-field light and to be applied a magnetic field. The slider section 57 includes a surface plasmon polariton direction change device of the present invention.

The control section 53 includes an access circuit 59, a recording circuit 60, a spindle driving circuit 61 and a control circuit 58. The access circuit 59 controls a rotation position of the arm 55 in the driving section 52 so as to move the slider section 57 to a target position on the magnetic recording medium 54. The recording circuit 60 causes the slider section 57 to control the intensity of near-field light and the irradiation time of the laser light. The spindle driving section 61 drives the spindle 51 so as to control rotation driving of the magnetic recording medium 54. The control circuit 58 carries out overall control with respect to the access circuit 59, the recording circuit 60 and the spindle driving circuit 61.

Comparative Example of Slider Section

Figure 10:
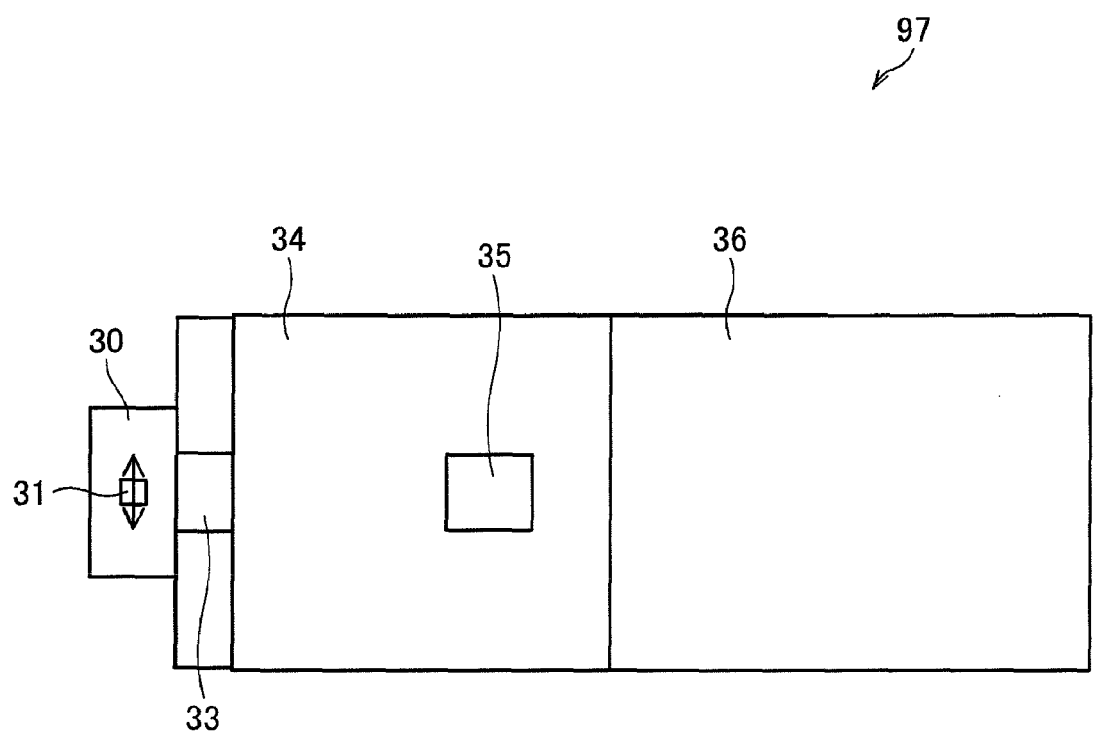
FIG. 10 is a plan view illustrating a comparative example of a slider section provided in the laser-assisted magnetic recording apparatus, as viewed from a magnetic recording medium side.

As described above, the laser-assisted magnetic recording apparatus 50 is arranged such that the slider section 57 includes a surface plasmon polariton direction change device of the present invention. Before dealing with the present embodiment, the following description deals with a comparative example in which a slider section does not include a surface plasmon polariton direction change device of the present invention with reference to FIG. 10. FIG. 10 is a plan view illustrating a slider section 97 which is a comparative example of the slider section 57, i.e., FIG. 10 is a drawing obtained when it is viewed from a magnetic recording medium 54 side.

The slider section 97 includes a light source 30, a near-field light excitation section (near-field light excitation means) 31, a magnetic field generating section 33, a magnetic shield layer 34, a reading element 35 and a slider 36.

It is preferable that the light source 30 is small, in view of the fact that the light source 30 is provided in the slider section 97. Further, it is preferable that the light source 30 is a semiconductor laser.

The near-field light excitation section 31 excites near-field light with the use of light (propagation light) irradiated by the light source 30. The near-field light excitation section 31 is a small aperture which is provided near the center of a metal film deposited on an output surface side of the light source 30. The small aperture has a diameter smaller than the wavelength of light emitted from the light source 30. This causes near-field light to be generated in the near-field light excitation section 31 in response to the light irradiated by the light source 30.

The comparative example deals with a case where the near-field light excitation section 31 is a small aperture. However, the comparative example is not limited to this. For example, the near-field light excitation section 31 can be fine metal particles provided on the metal film. Further, it is also possible to irradiate the near-field light excitation section 31 with the light from the light source 30, by causing the light from the light source 30 to obliquely enter into a grating, a prism or the like. Further, the present comparative example deals with a case where the light source 30 and the near-field light excitation section 31 are arranged so as to be integral with each other. Instead, the light source 30 and the near-field light excitation section 31 can be provided separately.

For example, in a case where the light source 30 and the near-field light excitation section 31 are arranged so as to be integral with each other, the near-field light excitation section 31 can be prepared as follows: depositing a metal film directly on the output surface of the light source 30, and preparing a small aperture in the metal film, as has been described above. In this case, both of the light source 30 and the near-field light excitation section 31 which are arranged so as to be integral with each other are provided in the slider 36. With the above arrangement in which the light source 30 and the near-field light excitation section 31 are arranged so as to be integral with each other, it becomes possible to reduce the number of parts constituting the slider section 97. This causes an improvement in assembly accuracy, thereby allowing an improvement in reliability. Further, the slider section 97 can be made compact.

Further, in a case where the light source 30 and the near-field light excitation section 31 are provided separately, it is necessary to provide means for guiding light from the light source 30 to the near-field light excitation section 31. A combination of optical parts such as a lens and a mirror can be used as the means for guiding the light to the near-field light excitation section 31. Alternatively, a waveguide such as optical fiber can be used as the means for guiding the light to the near-field light excitation section 31.

The arrangement in which the light source 30 and the near-field light excitation section 31 are provided separately causes the light source 30 not to be affected by heat generated in the near-field light excitation section 31 because the light source 30 and the near-field light excitation section 31 are spatially separated from each other. This makes it possible to stabilize oscillation of light.

The magnetic field generating section 33 is provided for applying a magnetic field onto the magnetic recording medium 54 so that a recording mark is recorded. The magnetic field generating section 33 is made of a magnetic material such as NiFe and NiFeTa. Generally, a coil is wounded around a part of the magnetic field generating section 33, and a direction of an electric current which flows through the coil is changed so that a direction of a recording magnetic field is controlled.

The magnetic shield layer 34 is provided for shielding a magnetic field of the magnetic field generating section 33 so as to prevent the reading element 35 from reading the magnetic field of the magnetic field generating section 33. The magnetic shield layer 34 can be made of, for example, a magnetic material such as NiFe and NiFeTa, like the magnetic field generating section 33. The magnetic shield layer 34 is provided adjacently to the slider 36. The magnetic field generating section 33 provided adjacent to a side of the magnetic shield layer 34 which side is opposite to the side where the slider 36 is provided. The magnetic shield layer 34 surrounds the reading element 35 so that the reading element 35 is away from the magnetic field generating section 33.

The reading element 35 serves as reading a recording mark which has been recorded on the magnetic recording medium 54, and serves as performing tracking while information is being recorded on the magnetic recording medium 54. For example, GMR (Giant Magneto Resistive) and TMR (Tunneling Magneto Resistive) are used as the reading element 35. Further, the magnetic shield layer 34 is provided so as to surround the reading element 35 so as to shield the reading element 35 from a magnetic field generated by the magnetic field generating section 33 so that the reading element 35 can detect a leakage magnetic field from the magnetic recording medium 54.

Further, the reading element 35 is vulnerable to heat, and is deteriorated or broken due to heat. As such, it is necessary to design the slider section 97 while taking into consideration influence due to heat. Despite this, considerable heat is generated because the slider section 97 includes the light source 30 in addition to the magnetic field generating section 33 and the reading element 35.

In view of this, it is preferable that the reading element 35 is separated from the light source 30 and the near-field light excitation section 31 which are heat sources so as not to be affected by heat. Therefore, the light source 30 is provided on a side of the magnetic field generating section 33 which side is opposite to a side where the magnetic shield layer 34 is provided. Furthermore, the reading element 35 is provided in the magnetic shield layer 34 so as not to be centrally-located but so as to be off-centered and closer to the slider 36.

The slider 36 is provided for controlling a distance between the slider section 97 and the magnetic recording medium 54. The slider 36 includes a surface, facing the magnetic recording medium 54, on which a concave/convex structure is provided for controlling a flying height of the slider section 97 from the magnetic recording medium 54. Note that FIG. 10 omits the concave/convex structure for controlling such a flying height.

Near-field light is excited in the near-field light excitation section 31 and a magnetic field is generated in the magnetic field generating section 33. Each of the near-field light and the magnetic field has (i) a smaller intensity and an intensity distribution (ii) as it is farther away from respective of locations where the near-field light and the magnetic field are generated. Therefore, it is preferable that the near-field light excitation section 31 and the magnetic field generating section 33 are provided as close to the magnetic recording medium 54 as possible.

Furthermore, it is also preferable that the reading element 35 is provided as close to the magnetic recording medium 54 as possible so as to be less affected by a leakage magnetic field from a neighboring mark while reading the leakage magnetic field from the magnetic recording medium 54.

That is, it is preferable that the slider section 97 is provided so that the slider 36 is as close to the magnetic recording medium 54 as possible. Generally, the slider section 97 is preferably provided so that the slider 36 is away from, by around several nanometers, from the magnetic recording medium 54. An AlTiC substrate and a $ZrO_2$ substrate are suitably used as a material of the slider 36. The slider 36 can be made up of a semiconductor laser material so that the semiconductor laser, serving as the light source 30 is integral with the slider 36.

According to the slider section 97 of the comparative example, a surface plasmon polariton 5 excited in the near-field light excitation section 31 is regretfully propagated in a direction parallel to a polarization direction (see the arrow in FIG. 10) of excited light, i.e., in a direction parallel to an active layer. This causes near-field light to be generated at a location away from the magnetic field generating section 33. As such, it is not preferable that the slider section 97 is applied to a laser-assisted magnetic recording apparatus.

It is possible in the slider section 97 that the surface plasmon polariton 5 is excited so as to be propagated toward the magnetic field generating section 33, by rotating the light source 30 by 90 degrees. In this case, however, it is difficult to form so that the light source 30 is integral with the slider section. Therefore, it is necessary that constituents other than the light source 30 are provided so as to be integral with each other, and then the light source 30 is attached to a side surface of the magnetic field generating section 33. However, in a case where the light source 30 is later attached, the following problem will occur. The positions of the near-field light and the recording magnetic field will not be consistent with each other, unless the positioning of the light source 30 is precisely carried out with respect to the magnetic field generating section 33. This causes a recording mark to spread.

Example 1 of Slider Section

Figure 11:
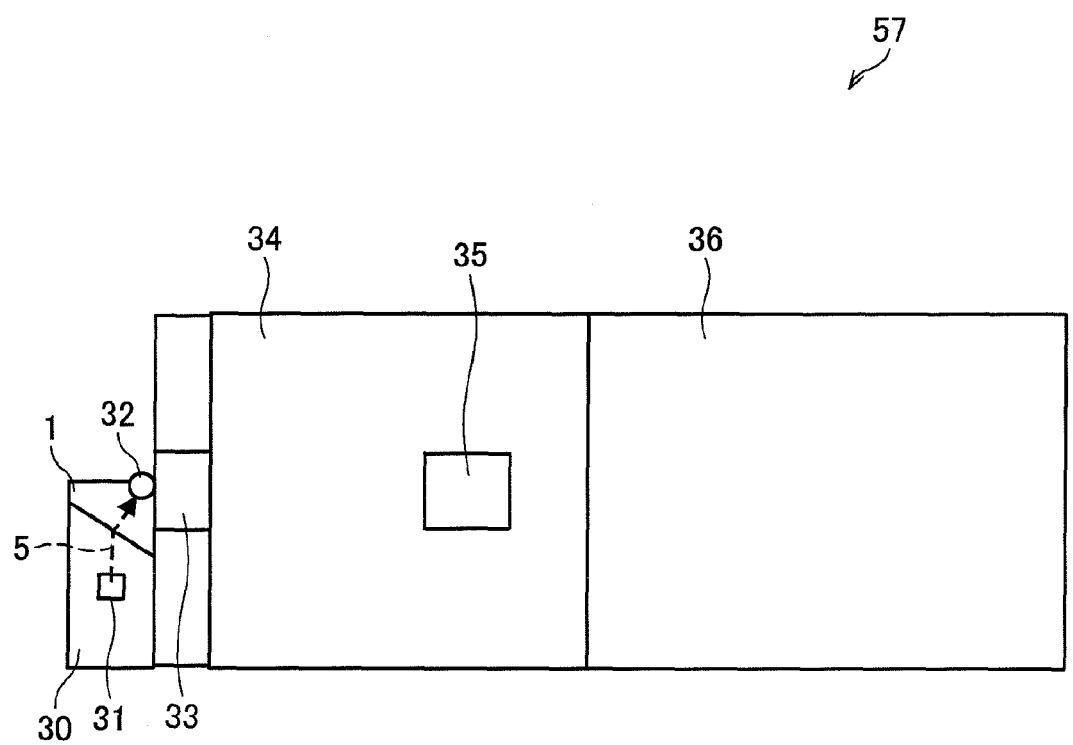
FIG. 11 is a plan view illustrating an Example 1 of the slider section provided in the laser-assisted magnetic recording apparatus, as viewed from a magnetic recording medium side.

In view of the circumstances, the following description deals with how the slider section 57 employing a surface plasmon polariton direction change device of the present invention is arranged so as to cause the surface plasmon polariton 5 excited in the near-field light excitation section 31 to be propagated to the vicinity of the magnetic field generating section 33, with reference to FIG. 11. FIG. 11 is a plan view, illustrating the slider section 57 of an Example 1 of a slider section, which plan view is obtained when the slider section 57 is viewed from a magnetic recording medium 54 side. Note that FIG. 11 omits the concave/convex structure for controlling a flying height provided on a slider 36. Further, constituents which have similar functions to those of the slider section 97 of the foregoing comparative example are given identical reference numerals, and are not explained repeatedly.

The slider section 57 of the present example includes a surface plasmon polariton direction change device 1, a light source 30, a near-field light excitation section 31, a near-field light output section (near-field light output means) 32, a magnetic field generating section 33, a magnetic shield layer 34, a reading element 35 and the slider 36. The slider section 57 can employ any of the surface plasmon polariton direction change devices 1, 11 and 21. The following description deals with a case where the slider section 57 employs the surface plasmon polariton direction change device 1.

The surface plasmon polariton direction change device 1 is arranged such that (i) the first metal film 3 and the second metal film 4 are directly deposited on an output surface of the light source 30 and (ii) a small aperture is provided in the first metal film 3 as the near-field light excitation section 31. That is, according to the slider section 57 of the present embodiment, the output surface of the light source 30 serves as the metal film support member 2 of the surface plasmon polariton direction change device 1. An arrangement of the surface plasmon polariton direction change device 1 provided on the output surface of the light source 30 is not limited to the above arrangement. Alternatively, the surface plasmon polariton direction change device 1 can be arranged such that (i) a dielectric layer made of a material having light transmittance is deposited, as the metal film support member 2, on the output surface of the light source 30, and then (ii) the first metal film 3 and the second metal film 4 are deposited on the dielectric layer.

The present example deals with the near-field light excitation section 31 is provided in the first metal film 3, on a premise that a surface plasmon polariton 5 is propagated from the first metal film 3 to the second metal film 4 in the surface plasmon polariton direction change device 1. However, the present invention is not limited to this. That is, the near-field light excitation section 31 can be provided in the second metal film 4, on a premise that a surface plasmon polariton 5 is propagated from the second metal film 4 to the first metal film 3 in the surface plasmon polariton direction change device 1. In other words, it is only necessary that a near-field light excitation section 31 is provided in at least one of metal films constituting a surface plasmon polariton direction change device of the present invention.

The near-field light output section 32 is a metal projection which is provided, in the vicinity of the magnetic field generating section 33, on a surface of the surface plasmon polariton direction change device 1 which surface faces the magnetic recording medium 54. The near-field light output section 32 converts into near-field light (localized surface plasmon polariton) a surface plasmon polariton 5 which has been propagated through the surface plasmon polariton direction change device 1. Then, the near-field light output section 32 irradiates, with the near-field light, a recording surface of the magnetic recording medium 54 so that the magnetic recording medium 54 is locally heated. This allows a recording mark to be recorded only on a part thus locally heated.

Even in a case where (i) a surface, on which the surface plasmon polariton 5 is propagated, faces the magnetic recording medium 54 and (ii) the magnetic recording medium 54 is irradiated by the near-field light generated in the small aperture of the near-field light excitation section 31, then the provision of a metal projection, serving as the near-field light output section 32, allows the magnetic recording medium 54 to be less affected because the intensity of the near-field light is attenuated by an amount corresponding to the height of the metal projection. The near-field light output section 32 can be an opening section, a slit or an edge of a metal film itself. Further, it is preferable that the near-field light output section 32 is arranged such that a propagation distance of the surface plasmon polariton 5 excited by the near-field light excitation section 31 is shorter than a propagation length of the surface plasmon polariton 5. This causes a reduction in intensity attenuation of the surface plasmon polariton 5, thereby allowing the near-field light output section 32 to generate near-field light having high intensity.

Constituents other than those described above are arranged and disposed in an identical manner to those of the slider section 97 of the comparative example. Therefore, such constituents are not described here.

With the arrangement, it becomes possible, with a simple construction, to cause the surface plasmon polariton 5 excited by the near-field light excitation section 31 to be propagated to the vicinity of the magnetic field generating section 33.

Further, even in a case where (i) the light source 30 is rotated by 90 degrees and (ii) the components other than the light source 30 are formed so as to be integral with each other, and then the light source 30 is attached to a side surface of the magnetic field generating section 33, it is possible to precisely carry out the positioning of the near-field light excitation section 31 with respect to the magnetic field generating section 33, by using a surface plasmon polariton direction change device of the present invention.

Example 2 of Slider Section

Figure 12:
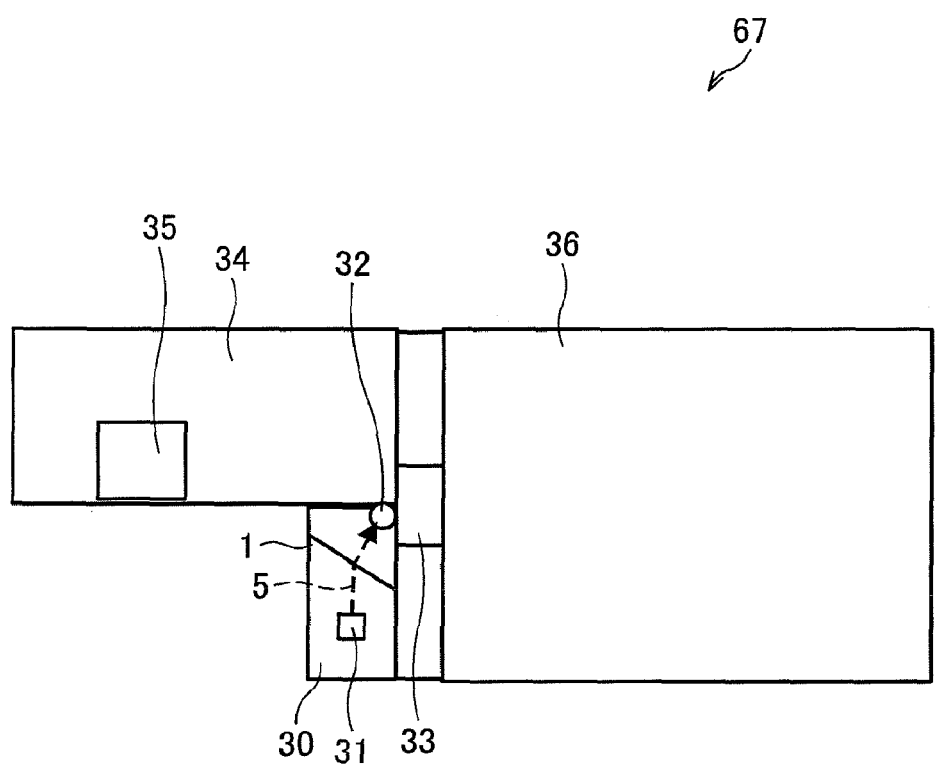
FIG. 12 is a plan view illustrating an Example 2 of the slider section provided in the laser-assisted magnetic recording apparatus, as viewed from a magnetic recording medium side.

The following deals with a slider section 67 of an Example 2 in accordance with a slider section with reference to FIG. 12. FIG. 12 is a plan view, illustrating the slider section 67 of the Example 2 of a slider section, which plan view is obtained when the slider section 67 is viewed from a magnetic recording medium 54 side. Note that FIG. 12 omits a concave/convex structure for controlling a flying height provided on a slider 36.

Constituents of the slider section 67 of the Example 2 have identical functions to those of the slider section 57 of the Example 1, and are different from those of the slider section 57 of the Example 1 only in how the constituents are provided. The following description deals with how the slider section 67 is arranged.

As shown in FIG. 12, the slider section 67 of the present example is arranged such that (i) a magnetic field generating section 33 is provided so as to be adjacent to the slider 36 and (ii) a magnetic shield layer 34 and the surface plasmon polariton direction change device 1 are provided so as to be adjacent to the magnetic field generating section 33 on a side of the magnetic field generating section 33 opposite to a side where the slider 36 is provided. A reading element 35 is provided so as to be away from the magnetic field generating section 33 while it is surrounded by the magnetic shield layer 34.

With the arrangement, when the slider section 67 is viewed from a magnetic recording medium 54 side, (i) the magnetic shield layer 34 is substantially half the size of the magnetic shield layer 34 of the slider section 57 of the Example 1 and (ii) the magnetic shield layer 34 is provided on the magnetic field generating section 33 so as to be adjacent to the surface plasmon polariton direction change device 1. This allows a reduction in size of the slider section 67.

Further, the reading element 35 surrounded by the magnetic shield layer 34 is provided so as to be away from the magnetic field generating section 33 and so as to be closer to the surface plasmon polariton direction change device 1. This allows (i) a reduction in distance between the reading element 35 and respective of a near-field light output section 32 and the magnetic field generating section 33, and (ii) a protection of the reading element 35 from heat and a magnetic field. Therefore, since a tracking error is made smaller, tracking can be performed more accurately.

Therefore, according to the slider section 67 of the present example, it is possible to carry out accurate tracking without enlarging the device and without affections of a light source 30, the near-field light output section 32 and the magnetic field generating section 33 on the reading element 35.

Example 3 of Slider Section

Figure 13:
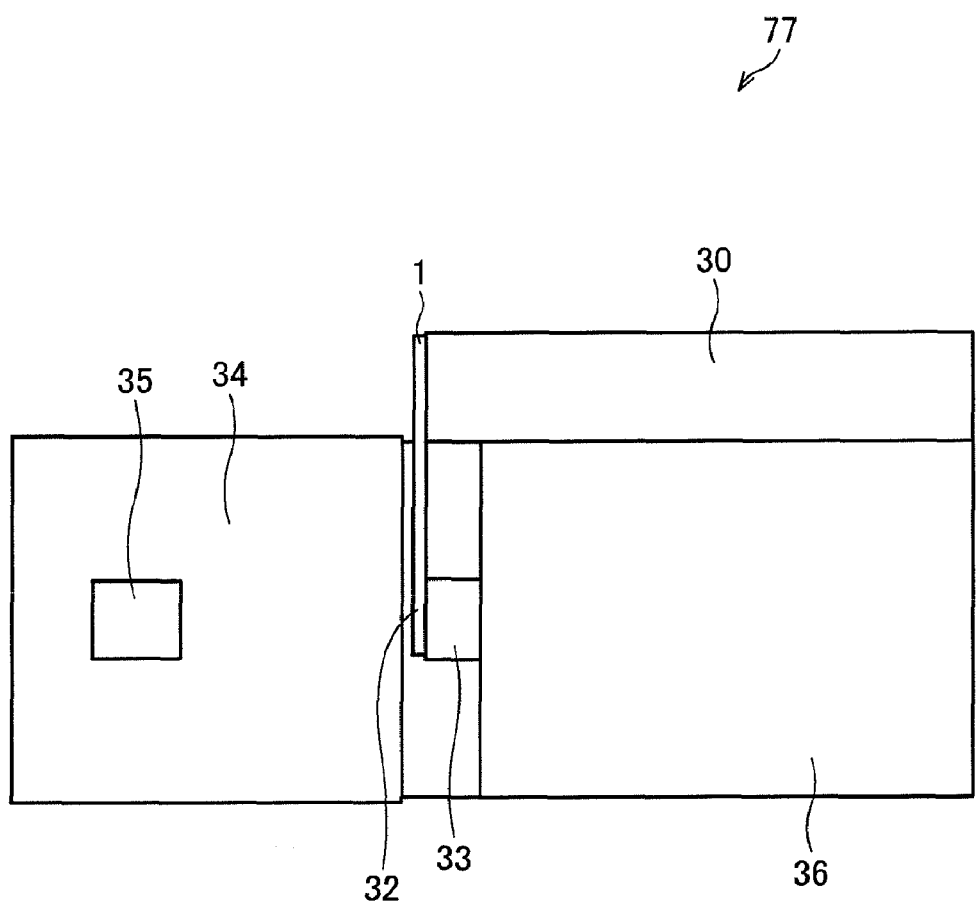
FIG. 13 is a plan view illustrating an Example 3 of the slider section provided in the laser-assisted magnetic recording apparatus, as viewed from a magnetic recording medium side.
Figure 14:
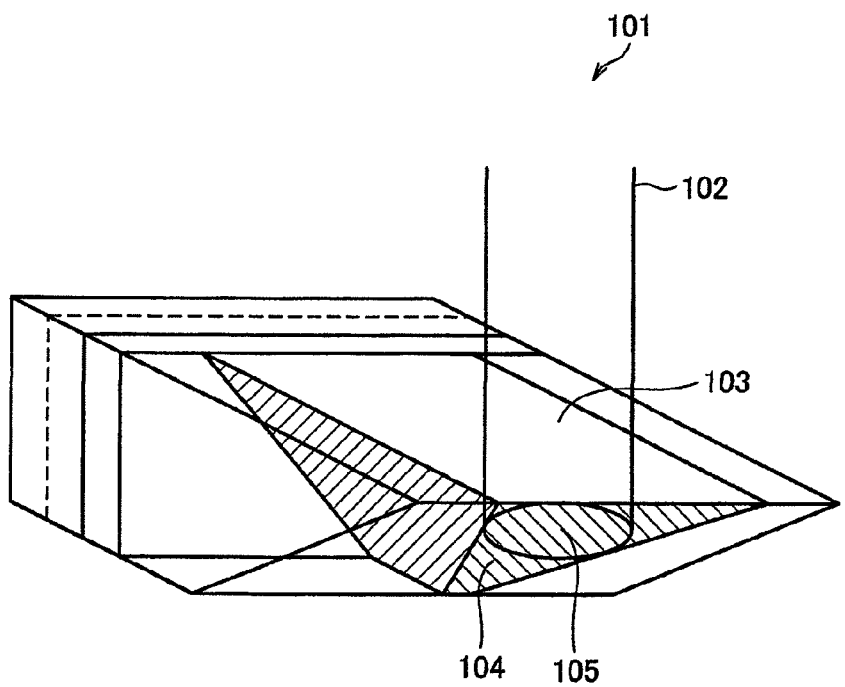
FIG. 14 is a perspective view illustrating a conventional read/write head used in a laser-assisted magnetic recording method.
Figure 15:
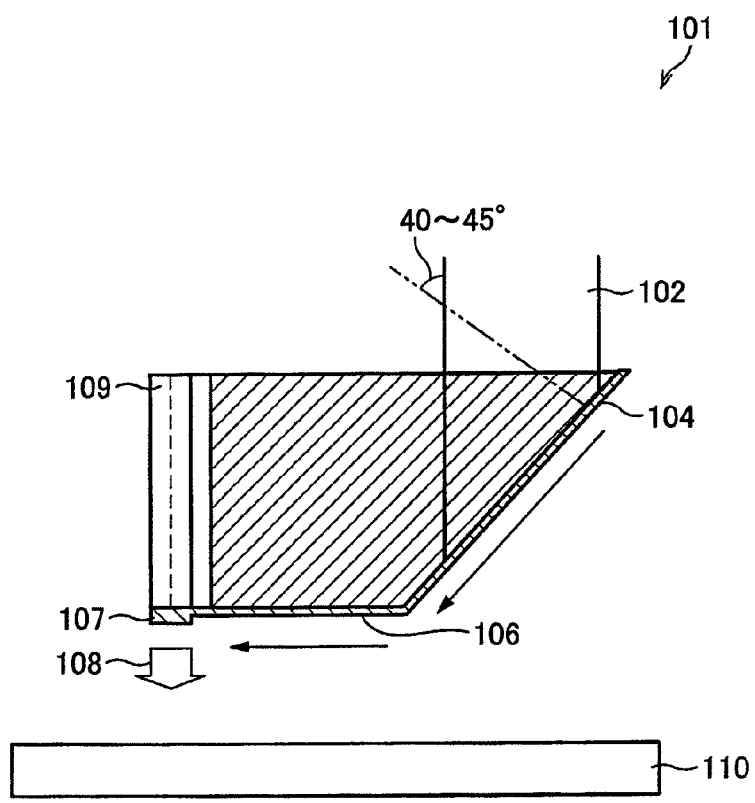
FIG. 15 is a cross-sectional view illustrating the read/write head, as viewed from a side of the read/write head of FIG. 14.

The following description deals with a slider section 77 of an Example 3 of a slider section with reference to FIG. 13. FIG. 13 is a plan view, illustrating the slider section 77 of the Example 3 of a slider section, which plan view is obtained when the slider section 77 is viewed from a magnetic recording medium 54 side. Note that FIG. 13 omits a concave/convex structure for controlling a flying height provided on a slider 36.

Constituents of the slider section 77 of the Example 3 have identical functions to those of the slider section 57 of the Example 1, and different from those of the slider section 57 of the Example 1 only in how the constituents are disposed. The following description deals with how the slider section 77 is arranged.

As shown in FIG. 13, the slider section 77 is arranged such that the slider 36 and a magnetic field generating section 33 are provided so as to be integral with each other and then a light source 30 is attached to a side wall of the slider 36. In this case, the light source 30 is provided so that its output surface is perpendicular to a magnetic recording medium 54. A surface plasmon polariton direction change device 1 is provided so as to extend from the output surface of the light source 30 to the magnetic field generating section 33. Further, a magnetic shield layer 34 and a reading element 35 are provided on a side of the magnetic field generating section 33 opposite to a side where the slider 36 is provided.

As described above, in the present example, the surface plasmon polariton direction change device 1 is provided so as to extend from the output surface of the light source 30 to the magnetic field generating section 33. That is, at least a part of the first metal film 3 and the second metal film 4 constituting the surface plasmon polariton direction change device 1 is provided on the output surface of the light source 30. However, the present invention is not limited to this. It is possible that the whole of the first metal film 3 and the second metal film 4 is provided on the output surface of the light source 30. Further, a near-field light excitation section 31 is provided on a part of the surface plasmon polariton direction change device 1, which part is on the output surface of the light source 30.

With the arrangement, light emitted from the output surface of the light source 30 is converted into a surface plasmon polariton 5 by the near-field light excitation section 31. The surface plasmon polariton 5 is propagated to a near-field light output section 32 on the surface perpendicular to the magnetic recording medium 54.

As described above, the output surface of the light source 30 is within a plane perpendicular to the magnetic recording medium 54. This causes prevention of irradiation of the magnetic recording medium 54 with light propagated from the light source 30. This makes it possible to prevent a background noise.

Further, a surface of the surface plasmon polariton direction change device 1 on which surface a surface plasmon polariton 5 is propagated does not face the magnetic recording medium 54. Therefore, it is possible that a distance between the magnetic recording medium 54 and the near-field light output section 32 is equal to a distance between the magnetic recording medium 54 and the magnetic field generating section 33, instead of providing a metal projection, serving as the near-field light output section 32, so that the near-field light excitation section 31 has a height different from the near-field light output section 32 in advance. Further, according to the slider section 77 of the present example, it is possible to prevent the surface plasmon polariton 5 propagating on the surface plasmon polariton direction change device 1 from being directed toward the magnetic recording medium 54, even in a case where an edge section of the surface plasmon polariton direction change device 1 serves as the near-field light output section 32. This is because the surface of the surface plasmon polariton direction change device 1, on which surface the surface plasmon polariton 5 is propagated, does not face the magnetic recording medium 54. This makes it possible to suppress a background noise.

[Operation of Laser-assisted Magnetic Recording Apparatus 50]

The following description deals with how the laser-assisted magnetic recording apparatus 50 operates with reference to FIG. 9.

While the laser-assisted magnetic recording apparatus 50 records or reproduces on or from the magnetic recording medium 54, i.e., while the laser-assisted magnetic recording apparatus 50 is in operation, the spindle driving circuit 61 in the control section 53 causes the spindle 51, where the magnetic recording medium 54 is placed, to rotate at an appropriate rotation number. Further, the access circuit 59 of the control section 53 drives the driving section 52 so that the foregoing slider section 57, 67 or 77 is moved to a target point on the magnetic recording medium 54.

The recording circuit 60 causes the light source 30 to emit light at a predetermined intensity and at predetermined time intervals, and causes the magnetic field generating section 33 to generate a magnetic field. Specifically, when the recording circuit 60 causes the light source 30 to emit light, the near-field light excitation section 31 is irradiated by the light. This causes a surface plasmon polariton 5 to be excited by the near-field light excitation section 31. The surface plasmon polariton 5 thus excited is propagated from the near-field light excitation section 31 toward the near-field light output section 32 by the surface plasmon polariton direction change device 1, 11 or 21. The magnetic recording medium 54 is irradiated, in the near-field light output section 32, with the surface plasmon polariton 5 serving as a localized surface plasmon polariton. At about the same time as this, the recording circuit 60 causes the magnetic field generating section 33 to generate a magnetic field. This allows the magnetic recording medium 54 to be irradiated by the near-field light and to receive a magnetic field at the same time.

Even in a case where the light source 30 always emits light, it is possible to record a mark on the magnetic recording medium 54 in response to a direction of a magnetic field generated by the magnetic field generating section 33, provided that the direction of the magnetic field is modulated.

In a case where the positions of the near-field light and the magnetic field are not consistent with each other, it is preferable to have an arrangement in which the magnetic recording medium 54 is irradiated by the near-field light before receiving the magnetic field.

In this way, a mark is recorded on the magnetic recording medium 54 in accordance with a localized magnetic field generated at an intensity and at time intervals corresponding to light-emission of the light source 30. The control circuit 58 carries out coverall control with respect to the light-emission of the light source 30, the operation of the driving section 52 and the rotation of the spindle 51, and issues instructions to each of the circuit so that target recording can be performed on a target position.

The magnetic recording medium 54 is a magneto-optical recording medium on which recording is carried out optically and magnetically. During a recording operation, a temperature rise occurs in a recording layer of the magnetic recording medium 54 in response to near-field light generated by the near-field light output section 32, and a magnetic field generated by the magnetic field generating section 33 is applied to the recording layer. This causes a direction of magnetic moment within the recording layer to be reversed. A part where the magnetic moment is reversed is a recording mark.

A size of a recording mark of the magnetic recording medium 54 varies depending on how (i) an area where a sufficient temperature rise occurs due to the near-field light and (ii) an area where a magnetic field is irradiated overlap each other. Therefore, it is possible to improve recording density by employing a near-field light output section 32 which generates near-field light having a small spot diameter. Further, a forming rate of a recording mark of the magnetic recording medium 54, i.e., a recording rate varies depending on a temperature rise rate of a recording layer. The temperature rise rate further varies depending on an intensity of applied near-field light. That is, the larger the intensity of irradiated near-field light becomes, the shorter the time required for heating the magnetic recording medium 54 to a required temperature becomes. This allows an improvement in transfer rate.

[Optical Circuit]

Further, a surface plasmon polariton direction change device of the present invention can be suitably used as (i) a direction change device in an optical circuit of an optical communication system or an optical computer and (ii) a demultiplexer and a multiplexer in an optical circuit using a multiplex communication method of an optical communication system, as well as the laser-assisted magnetic recording apparatus.

In a case where an optical signal is converted into a surface plasmon polariton and then the surface plasmon polariton is used in an optical circuit of an optical communication system or in an optical computer, it is necessary to have an arrangement in which a propagation direction of the surface plasmon polariton can be changed and branched into any directions.

Figure 25:
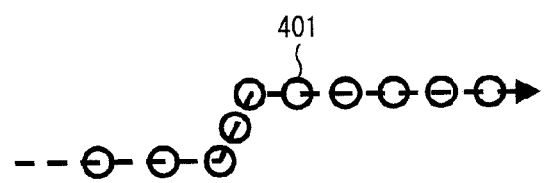
FIG. 25 is a view illustrating a direction change device in an optical circuit of conventional optical communication system and optical computer.

In view of this, the following devices have been conventionally proposed as a device for changing a direction of a surface plasmon polariton in an optical circuit of an optical communication system or of an optical computer. For example, the Patent Literature 2 discloses the metal film 201 and the surface plasmon lens 211, and the Non Patent Literature 2 discloses fine metal particles 401. As shown in FIG. 25, according to a technique disclosed in the Non Patent Literature 2, a plurality of fine metal particles 401 are arranged side by side, and electric dipoles are excited one by one so that a propagation direction of a surface plasmon polariton (dotted line) is changed or branched.

However, as has been described earlier, scattering of a surface plasmon polariton is caused at an edge in a case where the metal film 201 or the surface plasmon lens 211 disclosed in the Patent Literature 2 is used as a device for changing a direction of a surface plasmon polariton in an optical circuit of an optical communication system or of an optical computer. This causes a deterioration in signal intensity and in S/N ratio. Further, when there is a step, the step is likely to cause physical interference with another member. This causes lower flexibility in designing.

Further, in a case where the fine metal particles 401 disclosed in the Non Patent Literature 2 are used as a device for changing a direction of a surface plasmon polariton in an optical circuit of an optical communication system or of an optical computer, it is necessary to carry out precise and difficult operations such as adjusting (i) a polarization direction of a surface plasmon polariton, (ii) a size of the fine metal particles 401 and (iii) an interval of the fine metal particles 401, in order to cause the surface plasmon polariton to be propagated in any directions and at any intensity ratio.

On the other hand, it is possible to cause a surface plasmon polariton to be propagated in any directions with a simple arrangement, in a case where a surface plasmon polariton direction change device of the present invention is used as a device for changing a direction of a surface plasmon polariton in an optical circuit of an optical communication system or of an optical computer. Further, it is possible to prevent scattering of a surface plasmon polariton at an edge. This makes it possible to prevent lowering of the signal intensity.

Further, a surface plasmon polariton direction change device of the present invention can be suitably used as a demultiplexer or a multiplexer in an optical circuit using a multiplex communication method of an optical communication system.

In the multiplex communication method of the optical communication system, a large number of optical signals are simultaneously transmitted through a single communication path so that the capacity of the communication path is increased. The multiplex communication method of the optical communication system can be largely classified into (i) frequency division multiplexing in which a plurality of optical signals having different frequencies are mixed and multiplexed and (ii) time division multiplexing in which optical signals are multiplexed on time axis.

Figure 26:
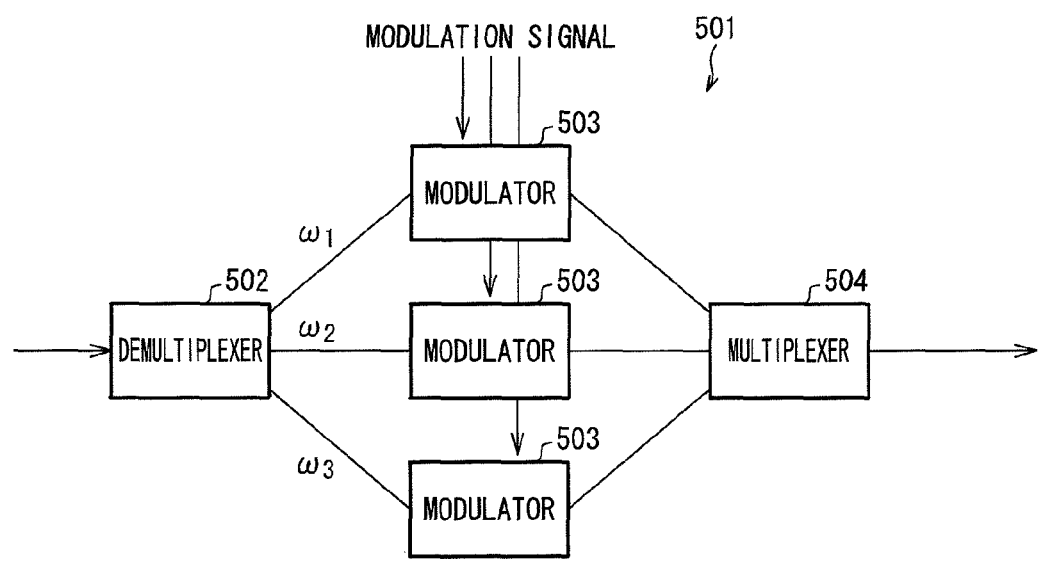
FIG. 26 is a view showing an example of an optical circuit using frequency division multiplexing of an optical communication system.

The following description deals with an optical circuit using the frequency division multiplexing as an example of an optical circuit using the multiplex communication method of the optical communication system with reference to FIG. 26. FIG. 26 is an exemplary view illustrating an optical circuit using the frequency division multiplexing.

As shown in FIG. 26, an optical circuit 501 using the frequency division multiplexing includes a demultiplexer (surface plasmon polariton demultiplexing means) 502, modulators 503 and a multiplexer (surface plasmon polariton multiplexing means) 504. Here, the optical circuit 501 using the frequency division multiplexing is of a parallel type. Therefore, three modulators 503 are provided in parallel with each other between the demultiplexer 502 and the multiplexer 504.

The demultiplexing number of an optical signal is not limited to three in the optical circuit 501 using the frequency division multiplexing. In the optical circuit 501 using the frequency division multiplexing, the number of the modulators 503 provided between the demultiplexer 502 and the multiplexer 504 changes in accordance with the demultiplexing number of an optical signal.

The following description deals with a method for multiplexing an optical signal with the use of the optical circuit 501 employing the frequency division multiplexing. First, the demultiplexer 502 demultiplexes a single optical signal, which has been transmitted to the optical circuit 501 and has three different frequencies $\omega 1$, $\omega 2$ and $\omega 3$, into three optical signals in accordance with their frequencies. The three optical signals are propagated to the three modulators 503, respectively, which are provided in parallel with each other. The modulators 503 modulate the three optical signals in accordance with the modulation signals corresponding to the optical signals, respectively, and cause the optical signals thus modulated to be propagated to the multiplexer 504. The multiplexer 504 mixes and multiplexes the optical signals thus modulated which have received from the modulators 503.

Figure 27:
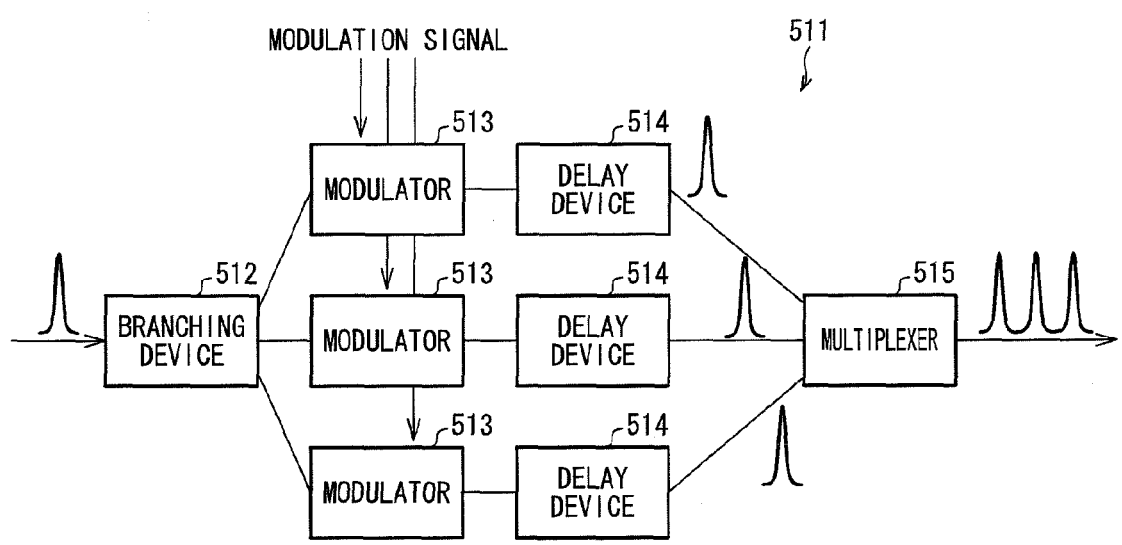
FIG. 27 is a view showing an example of an optical circuit using time division multiplexing of an optical communication system.

The following description deals with an optical circuit employing the time division multiplexing which is another example of an optical circuit employing the multiplex communication method of the optical communication system with reference to FIG. 27. FIG. 27 is a view illustrating an example of the optical circuit employing the time division multiplexing.

As shown in FIG. 27, an optical circuit 511 employing the time division multiplexing includes a branching device (surface plasmon polariton branching means) 512, modulators 513, delay devices 514 and a multiplexer (surface plasmon polariton synthesis means) 515. Here, the optical circuit 511 employing the time division multiplexing is of a parallel type. Therefore, three pairs of the modulator 513 and the delay device 514 are provided in parallel with each other between the branching device 512 and the multiplexer 515.

The branch number of an optical signal is not limited to three in the optical circuit 511 employing the time division multiplexing. In the optical circuit 511 employing the time division multiplexing, each of the number of the modulators 513 and the delay devices 514 provided between the branching device 512 and the multiplexer 515 changes in accordance with the branch number of an optical signal.

The following description deals with a method for multiplexing an optical signal with the use of the optical circuit 511 employing the time division multiplexing. First, the branching device 512 branches a single optical signal, which has been received from the optical circuit 511, into three optical signals, and causes the three optical signals to be propagated to the three modulators 513, respectively, which are provided in parallel with each other. The modulators 513 modulate the optical signals in accordance with modulation signals corresponding to the optical signals, and cause the optical signals thus modulated to be propagated to the delay devices 514, respectively. The delay devices 514 delays the optical signals thus branched so that the optical signals thus branched do not overlap each other on time axis when they are multiplexed. Further, the delay devices 514 cause the optical signals thus branched to be propagated to the multiplexer 515. The multiplexer 515 mixed and multiplexes the optical signals received from the delay devices 514.

That is, the optical circuit 501 employing the frequency division multiplexing is arranged such that the demultiplexer 502 demultiplexes a single optical signal having different frequencies in accordance with the frequencies, respectively, whereas the optical circuit 511 employing the time division multiplexing is arranged such that the branching device 512 branches a single optical signal having a single frequency into a plurality of optical signals.

In the optical circuit 501 employing the frequency division multiplexing, it is possible to use a surface plasmon polariton direction change device of the present invention as the demultiplexer 502 and the multiplexer 504, by converting an optical signal transmitted to the optical circuit 501 into a surface plasmon polariton before the optical signal is propagated to the demultiplexer 502.

The following description deals with how a surface plasmon polariton 5 is demultiplexed and multiplexed in a case where a surface plasmon polariton direction change device of the present invention is used as the demultiplexer 502 and the multiplexer 504 of the optical circuit 501 employing the frequency division multiplexing. Any one of the surface plasmon polariton direction change devices 1, 11 and 21 can be used as each of the demultiplexer 502 and the multiplexer 504 of the optical circuit 501 employing the frequency division multiplexing. The following description deals with a case in which the surface plasmon polariton direction change device 1 is used as each of the demultiplexer 502 and the multiplexer 504, for convenience.

As described above, a refraction angle of the surface plasmon polariton 5 depends on (i) an effective refractive index ratio between the first metal film 3 and the second metal film 4 and (ii) an incident angle of the surface plasmon polariton 5 with respect to the boundary between the first metal film 3 and the second metal film 4. Here, as described above, the effective refractive indices of the first metal film 3 and the second metal film 4 vary depending on not only (i) metal materials of which the first metal film 3 and the second metal film 4 are made, respectively, (ii) modes of the surface plasmon polariton 5, (iii) thicknesses of the first metal film and the second metal film, (iv) refractive index of a medium with which the metal films are in contact, but also frequency of the surface plasmon polariton 5.

Therefore, in a case where surface plasmon polaritons 5 having different frequencies are entered from the first metal film 3 to the second metal film 4 at the same incident angle in the surface plasmon polariton direction change device 1, directions in which the surface plasmon polaritons 5 are refracted, respectively, at the boundary between the first metal film 3 and the second metal film 4 differ from frequency to frequency. This is because the effective refractive indices of the first metal film 3 and the second metal film 4 differ from frequency to frequency.

Therefore, it is possible to demultiplex surface plasmon polaritons 5 having different frequencies in accordance with the frequencies, respectively, by using the surface plasmon polariton direction change device 1 as the demultiplexer 502 of the optical circuit 501 employing the frequency division multiplexing.

Further, it is clearly possible to multiplex a plurality of surface plasmon polaritons 5 which are divided in accordance with their frequencies, respectively, by using the surface plasmon polariton direction change device 1 as the multiplexer 504 of the optical circuit 501 employing the frequency division multiplexing, and by causing the surface plasmon polaritons 5 to be propagated in a direction reverse to the abovementioned propagation paths.

As described above, it is possible to prevent scattering of the surface plasmon polaritons 5 at an edge and to obtain an optical circuit having high flexibility in designing by using a surface plasmon polariton direction change device of the present invention as the demultiplexer 502 and the multiplexer 504 of the optical circuit 501 using the frequency division multiplexing.

Further, it is possible to prevent intensity attenuation of a surface plasmon polaritons 5 in a case where a surface plasmon polariton direction change device 21 of the Embodiment 3 of the present invention is used as each of the demultiplexer 502 and the multiplexer 504 of the optical circuit 501 employing the frequency division multiplexing. This is because the surface plasmon polaritons 5 can be demultiplexed and multiplexed in a shorter distance, as compared with a case where the surface plasmon polariton direction change device 1 or 11 which has a single boundary between the metal films is used.

In the optical circuit 511 using the time division multiplexing, it is possible to use, as each of the branching device 512 and the multiplexer 515, a surface plasmon polariton direction change device 41 which employs a surface plasmon polariton direction change device of the present invention, by converting an optical signal transmitted to the optical circuit 511 into a surface plasmon polariton before the optical signal is propagated to the branching device 512.

Figure 28:
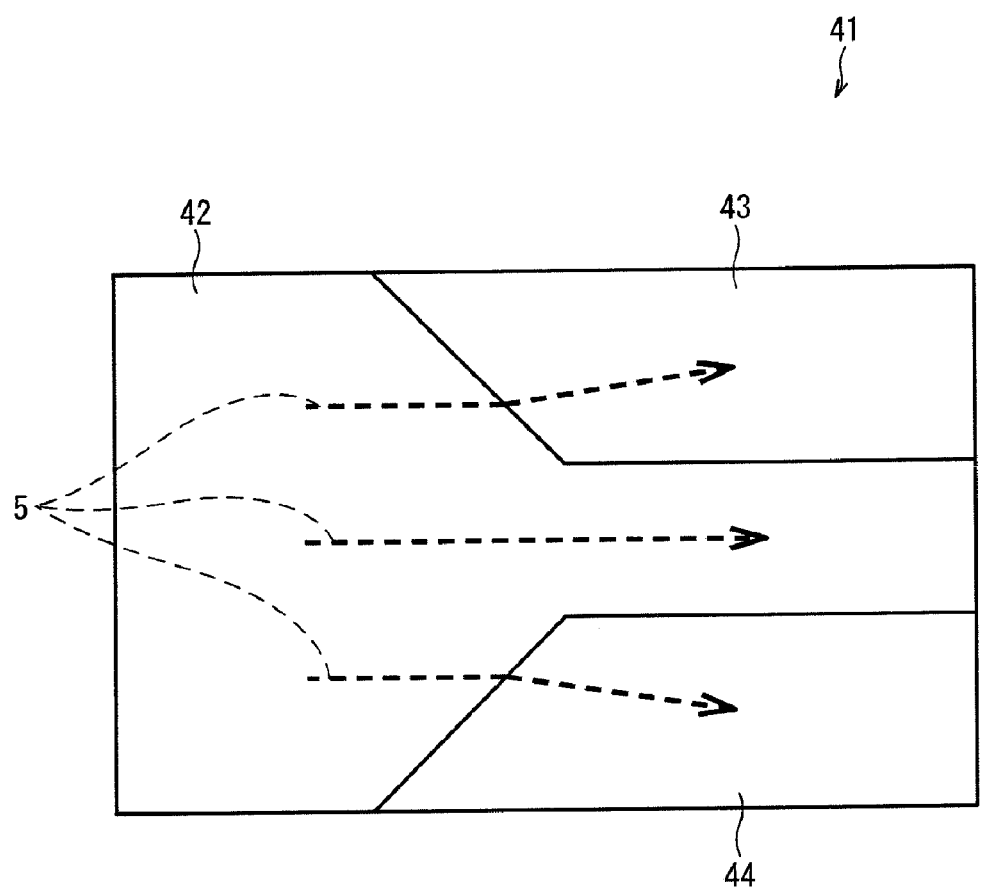
FIG. 28 is a plan view illustrating a surface plasmon polariton direction change device used as a branching device and a multiplexer of an optical circuit using the time division multiplexing.

The following description deals with an arrangement of the surface plasmon polariton direction change device 41 with reference to FIG. 28. FIG. 28 is a plan view illustrating the surface plasmon polariton direction change device 41 which is used as each of the branching device 512 and the multiplexer 515 of the optical circuit 511 employing the time division multiplexing. Constituents which have similar functions to those of the surface plasmon polariton direction change device 1 of the Embodiment 1 are given identical reference numerals, and are not explained repeatedly.

As shown in FIG. 28, the surface plasmon polariton direction change device 41 includes a first metal film 42, a second metal film 43 and a third metal film 44. Note that the first metal film 42, the second metal film 43 and the third metal film 44 are provided on a surface of a metal film support member 2 (not shown).

The first metal film 42, the second metal film 43 and the third metal film 44 are provided so as to be in contact with each other on the surface of the metal film support member 2 which has a plate shape and has a predetermined thickness. Further, surfaces of the metal films which are opposite to surfaces in contact with the metal film support member 2 are flush with one another.

Further, the first metal film 42 has an effective refractive index different from respective of the second metal film 43 and the third metal film 44. The second metal film 43 and the third metal film 44 can be different in refractive index. Alternatively, the second metal film 43 and the third metal film 44 can have the same refractive index. Flexibility in designing a refractive index can be improved in a case where the second metal film 43 and the third metal film 44 are different in refractive index. Manufacturing steps can be reduced in a case where the second metal film 43 and the third metal film 44 have the same refractive index, i.e., in a case where the second metal film 43 and the third metal film 44 are made of the same metal material and have the same thickness.

Here, shapes of the first metal film 42, the second metal film 43 and the third metal film 44 are explained specifically. The following description deals with a case where the surface plasmon polariton direction change device 41 has a rectangular shape. However, the surface plasmon polariton direction change device 41 is not limited to this shape. That is, the surface plasmon polariton direction change device 41 can have any shape, provided that (i) metals films which are different in refractive index are in contact with each other and (ii) surfaces of the metal films which are opposite to surfaces in contact with the metal film support member 2 are flush with one another.

The first metal film 42 occupies about one third of the surface plasmon polariton direction change device 41 in a longitudinal direction. The about two thirds of the surface plasmon polariton direction change device 41 are divided substantially equally among the first metal film 42, the second metal film 43 and the third metal film 44 in a direction perpendicular to the longitudinal direction.

Further, in the direction perpendicular to the longitudinal direction of the surface plasmon polariton direction change device 41, (i) a boundary between the first metal film 42 and the second metal film 43 and (ii) a boundary between the first metal film 42 and the third metal film 44 are provided so that an incident angle θ1 satisfies 0°<θ1<90° or −90°<θ1<0° in a case where a surface plasmon polariton 5 is propagated from the first metal film 42 toward (a) the boundary between the first metal film 42 and the second metal film 43 and (b) the boundary between the first metal film 42 and the third metal film 44.

In FIG. 28, (i) the boundary between the first metal film and the second metal film 43 and (ii) the boundary between the first metal film 42 and the third metal film 44 which extend parallel to the long side of the surface plasmon polariton direction change device 41 are provided in parallel to the long side of the surface plasmon polariton direction change device 41. However, the present invention is not limited to this.

The following description deals with a change in a propagation direction of a surface plasmon polaritons 5 in the surface plasmon polariton direction change device 41. In a case where the surface plasmon polaritons 5 are propagated from the first metal film 42 in the longitudinal direction of the surface plasmon polariton direction change device 41 as shown by the dotted line in FIG. 28, the surface plasmon polaritons 5 are spatially divided at (i) the boundary between the first metal film 42 and the second metal film 43 and (ii) the boundary between the first metal film 42 and the third metal film 44 which extend in the direction perpendicular to the longitudinal direction of the surface plasmon polariton direction change device 41. Further, surface plasmon polaritons 5 which did not enter into the boundary keep going straight.

Thus, the surface plasmon polariton direction change device 41 has the first metal film 42, the second metal film 43 and the third metal film 44 serving as propagation paths for branching the surface plasmon polaritons 5 which are propagated on the first metal film 42. Further, it is possible to change an intensity ratio of the surface plasmon polaritons 5 which propagate the propagation paths, respectively, in accordance with a dividing ratio of the first metal film 42, the second metal film 43 and the third metal film 44 in the direction perpendicular to the longitudinal direction of the surface plasmon polariton direction change device 41.

Therefore, it is possible to spatially divide the surface plasmon polaritons 5 in a plurality of directions at any intensity ratio by using the surface plasmon polariton direction change device 41 as the branching device 512 of the optical circuit 511 employing the time division multiplexing.

Note that the first metal film 42, the second metal film and the third metal film 44 are not limited to the above-mentioned shapes. That is, the first metal film 42, the second metal film 43 and the third metal film 44 can have any shape, provided that the surface plasmon polaritons 5 are partially blocked by parts of the boundaries between the adjacent metal films so that the surface plasmon polaritons 5 can be spatially divided and can be propagated in a plurality of directions, respectively.

Further, the present embodiment is not limited to a case where the first metal film 42, the second metal film 43 and the third metal film 44 are provided. Alternatively, it is possible that only the first metal film 42 and the second metal film 43 are used, for example, in a case where the surface plasmon polaritons 5 are divided in two directions.

Further, the present embodiment is not limited to the above arrangement in a case where the surface plasmon polaritons 5 are spatially divided in a plurality of directions. For example, it is possible to arrange a boundary between the first metal film 3 and the second metal film 4 in the surface plasmon polariton direction change device 1 of the Embodiment 1 so that the boundary has a dogleg shape.

Further, it is clearly possible to multiplex a plurality of spatially-divided surface plasmon polaritons 5 by using the surface plasmon polariton direction change device 41 as the multiplexer 515 of the optical circuit 511 employing the time division multiplexing and by causing the surface plasmon polaritons 5 to be propagated in a direction reverse to the above-mentioned propagation paths.

It is possible to prevent scattering of the surface plasmon polaritons 5 at an edge and to obtain an optical circuit having high flexibility in designing by using, as the divider 112 and the multiplexer 515 of the optical circuit 511 employing the time division multiplexing, a surface plasmon polariton direction change device 41 which utilizes a surface plasmon polariton direction change device of the present invention.

The present invention is not limited to the description of the embodiments above, but can be altered by a skilled person within the scope of the claims. An embodiment based on a proper combination of technical means disclosed in different embodiments is encompassed in the technical scope of the present invention.

In order to solve the above problems, a surface plasmon polariton direction change device of the present invention is a surface plasmon polariton direction change device for changing a propagation direction of a surface plasmon polariton, including: a metal film support member, and at least two metal films which are provided on a predetermined surface of the metal film support member, are adjacent to each other, and are different from each other in effective refractive index, said at least two metal films being provided so that, in at least a part of respective boundary between adjacent ones of said at least two metal films, an angle θ defined by (i) a line perpendicular to the boundary and (ii) the propagation direction of the surface plasmon polariton satisfies 0°<θ<90° or −90°<θ<0°, and surfaces of said at least two metal films which surfaces are opposite to surfaces in contact with the metal film support member being flush with each other.

According to the above arrangement, metal films which are formed on a predetermined surface of a metal film support member, are adjacent to each other, and are different from each other in effective refractive index are provided so that, in at least a part of respective boundary between the metal films, an angle θ formed between (i) a line perpendicular to the boundary and (ii) a propagation direction of the surface plasmon polariton satisfies 0°<θ<90° or −90°<θ<0°. This makes it possible to change the propagation direction of the surface plasmon polariton at the boundary.

Further, a propagation direction of a surface plasmon polariton can be adjusted in accordance with adjustments of the angle θ. Therefore, a surface plasmon polariton direction change device of the present invention offers (i) greater flexibility in designing and (ii) easier control of a propagation direction of a surface plasmon polariton, as compared with the surface plasmon lens 211 disclosed in the Patent Literature 2 which changes a propagation direction of a surface plasmon polariton by changing a thickness of the metal film 215 and refractive indices of the first dielectric layer 213 and the second dielectric layer 214.

Here, it is possible to prevent scattering of the surface plasmon polariton at an edge between the metal films and to prevent the surface plasmon polariton from being irradiated onto an irradiated subject.

As a result, a surface plasmon polariton direction change device of the present invention can increase intensity of a surface plasmon polariton propagated to an adjacent metal film and can prevent a background noise due to scattered light. Further, it is unnecessary to worry about a difference in thickness when some sort of film is formed on a surface plasmon polariton direction change device of the present invention.

Further, the surface plasmon polariton direction change device of the present invention may be arranged such that a first metal film, a second metal film and a third metal film are provided adjacently to each other in this order, and the first metal film, the second metal film and the third metal film are provided so that (i) a boundary between the first metal film and the second metal film and (ii) a boundary between the second metal film and the third metal film are not parallel to each other.

A propagation direction of a surface plasmon polariton can be adjusted in accordance with adjustments of effective refractive indices of metal films and an angle formed between (i) a line perpendicular to a boundary between the metal films and (ii) the propagation direction of the surface plasmon polariton. Therefore, with the above arrangement, a surface plasmon polariton can be more precisely propagated to a predetermined position, as compared with a case where there is only one boundary between metal films.

Further, the surface plasmon polariton direction change device of the present invention may be arranged such that said at least two metal films are made of different materials, respectively.

When metal films are made of different materials, the metal films have different effective refractive indices. According to the above arrangement, metal films are made of different materials. Therefore, the metal films have different effective refractive indices. This makes it possible to easily control a propagation direction of a surface plasmon polariton. Further, an effective refractive index ratio between the metal films due to a difference of materials of which the metal films are made can be wider in range, as compared with a case where dielectric layers are used. This makes it possible to increase a refraction angle of a surface plasmon polariton at a boundary between the metal films.

Further, the surface plasmon polariton direction change device of the present invention may be arranged such that said at least two metal films have the same thickness.

A difference can be produced in effective refractive index between metal films when the metal films are made of different materials. Therefore, the metal films can have the same thickness. According to the above arrangement, there is no edge between the metal films in a surface plasmon polariton direction change device of the present invention. This makes it possible (i) to prevent scattering of a surface plasmon polariton at the edge, (ii) to increase an intensity of the surface plasmon polariton which is propagated to the adjacent metal film, and (iii) to suppress an influence caused by a background noise due to scattered light.

Further, the surface plasmon polariton direction change device of the present invention may be arranged such that said at least two metal films have different thicknesses, respectively.

A difference can be produced in effective refractive index between metal films when the metal films have different thicknesses. According to the above arrangement, metal films have different thicknesses. This makes it possible to produce a difference in effective refractive index between the metal films. In this case, surfaces of the metal films which are opposite to surfaces in contact with a metal film support member are flush with one another. This makes it possible (i) to prevent scattering of a surface plasmon polariton at an edge between the metal films, (ii) to increase an intensity of the surface plasmon polariton which is propagated to the adjacent metal film, and (iii) to suppress an influence caused by a background noise due to scattered light.

Further, the surface plasmon polariton direction change device of the present invention may be arranged such that the first metal film and the third metal film have the same effective refractive index.

According to the above arrangement, a first metal film and a third metal film can be made of the same material when a surface plasmon polariton direction change device of the present invention is manufactured. This makes it possible to reduce manufacturing steps.

Further, the surface plasmon polariton direction change device of the present invention may be arranged such that a distance between (i) the boundary between the first metal film and the second metal film and (ii) the boundary between the second metal film and the third metal film is shorter than a propagation length of the surface plasmon polariton.

According to the above arrangement, intensity attenuation of a surface plasmon polariton is not caused while the surface plasmon polariton is propagated to a third metal film or a first metal film in a case where light from a light source is converted into a surface plasmon polariton in the first metal film or the third metal film and the surface plasmon polariton is propagated to the third metal film or the first metal film so that near-field light is generated. This makes it possible to generate near-field light having a sufficient intensity in the first metal film or the third metal film.

Further, the surface plasmon polariton direction change device of the present invention may be arranged such that the surface plasmon polariton is partially blocked by a part of respective boundary between adjacent ones of said at least two metal films.

According to the above arrangement, a surface plasmon polariton partially enters into a boundary between adjacent metal films and is refracted at the boundary. Further, a surface plasmon polariton which did not enter into the boundary keeps going straight. That is, according to the above arrangement, a surface plasmon polariton can be divided so as to be propagated in a plurality of directions. Further, it is possible to freely change the number of branch of the surface plasmon polariton by changing the number of adjacent metal films.

A read/write head of the present invention is a read/write head for use in a laser-assisted magnetic recording apparatus for recording and reproducing information on and from a magnetic recording medium, respectively, including: the surface plasmon polariton direction change device, a light source, near-field light excitation means for converting light emitted from the light source into a surface plasmon polariton, and near-field light output means for irradiating the magnetic recording medium with near-field light, the surface plasmon polariton direction change device causing the surface plasmon polariton to be propagated from the near-field light excitation means toward the near-field light output means.

According to the above arrangement, a surface plasmon polariton which is converted from light from a light source at a near-field light excitation section can be propagated to near-field light output means for irradiating a magnetic recording medium with near-field light. This makes it possible to apply near-field light and a magnetic field to a magnetic recording medium so that the near-field light and the magnetic field are close to each other even if (i) the magnetic field generating section for applying a magnetic field to a magnetic recording medium and (ii) a light source are provided apart from each other in a read/write head. This is because the near-field light output means is provided in the vicinity of a magnetic field generating section. Further, the above arrangement allows greater flexibility in disposing a reading element so that (i) the reading element can be prevented from being deteriorated due to heat of the light source and from being influenced by a magnetic field generated by the magnetic field generating section and (ii) accurate tracking can be performed. This allows a reduction in size and weight of the whole device.

Further, the read/write head of the present invention may be arranged such that the metal film support member of the surface plasmon polariton direction change device is a substrate having light transmittance, the near-field light excitation means is the substrate, and light is obliquely entered to the surface plasmon polariton direction change device from a side where the substrate is provided so that surface plasmon polariton is excited in at least one of said at least two metal films.

According to the above arrangement, a metal film support member which is a constituent of a surface plasmon polariton direction change device can be used as near-field light excitation means. This makes it unnecessary to provide another member in a surface plasmon polariton direction change device in order to generate a surface plasmon polariton. This makes it possible to easily generate a surface plasmon polariton in a surface plasmon polariton direction change device and to easily manufacture a surface plasmon polariton direction change device. Further, it is possible to suppress a background noise on surfaces of metal films which are opposite to surfaces in contact with a metal film support member by using the metal film support member as near-field light excitation means when a surface plasmon polariton is generated on the metal films.

Further, the read/write head of the present invention may be arranged such that the predetermined surface of the metal film support member of the surface plasmon polariton direction change device is an output surface from which the light of the light source is emitted, and the near-field light excitation means is provided in at least one of said at least two metal films.

According to the above arrangement, metal films of a surface plasmon polariton direction change device are provided on an output surface of a light source. This makes it possible to suppress a background noise due to propagation light emitted from the light source. Further, according to the above arrangement, near-field light excitation means is provided in at least one of the metal films. Therefore, a surface plasmon polariton can be excited on said at least one of the metal films by light emitted from the light source.

Further, the read/write head of the present invention may be arranged such that a distance from the near-field light excitation means to the near-field light output means is shorter than the propagation length of the surface plasmon polariton.

According to the above arrangement, a surface plasmon polariton which was converted from light from a light source at near-field light excitation means can be propagated to near-field light output means before an intensity of the surface plasmon polariton is attenuated. This makes it possible to generate near-field light having a sufficient intensity.

Further, the read/write head of the present invention may be arranged such that the near-field light excitation means is a small aperture which is smaller than a wavelength of the light emitted from the light source.

According to the above arrangement, a small aperture is provided, as near-field light excitation means, in a metal film of a surface plasmon polariton direction change device, the metal film being provided on an output surface of a light source. This makes it possible to convert light into a surface plasmon polariton by irradiating the light from the light source to the small aperture. The small aperture is provided in a surface plasmon polariton direction change device. Therefore, use efficiency of a surface plasmon polariton is higher, as compared with a case where a surface plasmon polariton is excited outside a surface plasmon polariton direction change device and then is propagated to the surface plasmon polariton direction change device. Further, there is no optical system between a near-field light converting section and a light source. Therefore, the number of parts can be reduced. This makes it possible to easily and precisely manufacture a surface plasmon polariton direction change device and to make the surface plasmon polariton direction change device smaller.

Further, the read/write head of the present invention may be arranged such that the near-field light generating section is a metal projection.

According to the above arrangement, even in a case where (i) a surface, on which the surface plasmon polariton is propagated, faces the magnetic recording medium, (ii) the surface plasmon polariton is converted into near-field light at a near-field light generating section which is a metal projection, and (iii) the magnetic recording medium is irradiated by the near-field light, then the provision of a metal projection allows the magnetic recording medium to be less affected because the intensity of the near-field light is attenuated by an amount corresponding to the height of the metal projection.

Further, the read/write head of the present invention is arranged such that the output surface from which the light of the light source is emitted is within a plane perpendicular to the magnetic recording medium.

The above arrangement makes it possible to prevent a magnetic recording medium from being irradiated by propagation light from a light source. This makes it possible to suppress a background noise.

Further, a laser-assisted magnetic recording apparatus of the present invention is a laser-assisted magnetic recording apparatus for recording and reproducing information on and from a magnetic recording medium, respectively, including the read/write head.

The above arrangement makes it possible to prevent scattering of a surface plasmon polariton at an edge and to obtain a laser-assisted magnetic recording apparatus having high flexibility in designing.

An optical circuit of the present invention is an optical circuit employing frequency division multiplexing, in an optical communication system, including surface plasmon polariton separating means for separating a surface plasmon polariton having a plurality of different frequencies, in accordance with the frequencies, respectively, the surface plasmon polariton separating means being the surface plasmon polariton direction change device.

Further, an optical circuit of the present invention is an optical circuit employing frequency division multiplexing, in an optical communication system, including surface plasmon polariton mixing means for mixing a plurality of surface plasmon polaritons having different frequencies, the surface plasmon polariton mixing means being the surface plasmon polariton direction change device.

Further, an optical circuit of the present invention is an optical circuit employing time division multiplexing, in an optical communication system, including surface plasmon polariton branching means for branching a surface plasmon polariton into a plurality of directions, the surface plasmon polariton branching means being the surface plasmon polariton direction change device.

Further, an optical circuit of the present invention is an optical circuit employing time division multiplexing, in an optical communication system, including surface plasmon polariton integrating means for integrating surface plasmon polaritons propagated from a plurality of directions, the surface plasmon polariton integrating means being the surface plasmon polariton direction change device.

It is possible to prevent scattering of a surface plasmon polariton at an edge and to obtain an optical circuit having high flexibility in designing by using the surface plasmon polariton direction change device as (i) surface plasmon polariton demultiplexing means, (ii) surface plasmon polariton multiplexing means, (iii) surface plasmon polariton branching means or (iv) surface plasmon polariton integrating means, in an optical circuit employing the frequency division multiplexing or the time division multiplexing of an optical communication system.

INDUSTRIAL APPLICABILITY

The present invention can be suitably used as (i) a laser-assisted magnetic recording apparatus for carrying out recording with respect to a magnetic recording medium with the use of a laser-assisted magnetic recording method, (ii) a direction change device in an optical circuit of an optical communication system and an optical computer, and (iii) a demultiplexer and a multiplexer in an optical circuit employing multiplex communication method of an optical communication system.

REFERENCE SIGNS LIST 1, 11, 21, 41 Surface plasmon polariton direction change device
2 Metal film support member
3, 13, 22, 42 First metal film
4, 14, 23, 43 Second metal film
24, 44 Third metal film
5 Surface plasmon polariton
30 Light source
31 Near-field light excitation section (near-field light excitation means)
32 Near-field light output section (near-field light output means)
33 Magnetic field generating section
34 Magnetic shield layer
35 Reading element
36 Slider
50 Laser-assisted magnetic recording apparatus
51 Spindle
52 Driving section
53 Control section
54 Magnetic recording medium
55 Arm
56 Rotary shaft
57 Slider section (read/write head)
58 Control circuit
59 Access circuit
60 Recording circuit
61 Spindle driving circuit
501 Optical circuit using frequency division multiplexing
502 Demultiplexer (surface plasmon polariton demultiplexing means)
503 Modulator
504 Multiplexer (surface plasmon polariton multiplexing means)
511 Optical circuit using time division multiplexing
512 Branching device (surface plasmon polariton branching means)
513 Modulator
514 Delay device
515 Multiplexer (surface plasmon polariton integrating means)

The invention claimed is:

1. A surface plasmon polariton direction change device for changing a propagation direction of a surface plasmon polariton, comprising:
    a metal film support member, and
    at least two metal films which are provided on a predetermined surface of the metal film support member, are adjacent to each other, and are different from each other in effective refractive index,
    said at least two metal films being provided so that, in at least a part of respective boundary between adjacent ones of said at least two metal films, an angle $\theta$ defined by (i) a line perpendicular to the boundary and (ii) the propagation direction of the surface plasmon polariton satisfies $0°<\theta<90°$ or $-90°<\theta<0°$, and
    surfaces of said at least two metal films which surfaces are opposite to surfaces in contact with the metal film support member being flush with each other.

2. The surface plasmon polariton direction change device according to claim 1, wherein:
    said at least two metal films are a first metal film, a second metal film and a third metal film, which are provided adjacently to each other in this order, and
    the first metal film, the second metal film and the third metal film are provided so that (i) a boundary between the first metal film and the second metal film and (ii) a boundary between the second metal film and the third metal film are not parallel to each other.

3. The surface plasmon polariton direction change device according to claim 1, wherein
    said at least two metal films are made of different materials, respectively.

4. The surface plasmon polariton direction change device according to claim 3, wherein
    said at least two metal films have the same thickness.

5. The surface plasmon polariton direction change device according to claim 1, wherein
    said at least two metal films have different thicknesses, respectively.

6. The surface plasmon polariton direction change device according to claim 2, wherein
    the first metal film and the third metal film have the same effective refractive index.

7. The surface plasmon polariton direction change device according to claim 2, wherein
    a distance between (i) the boundary between the first metal film and the second metal film and (ii) the boundary between the second metal film and the third metal film is shorter than a propagation length of the surface plasmon polariton.

8. The surface plasmon polariton direction change device according to claim 1, wherein
    the surface plasmon polariton is partially blocked by a part of respective boundary between adjacent ones of said at least two metal films.

9. A read/write head for use in a laser-assisted magnetic recording apparatus for recording and reproducing information on and from a magnetic recording medium, respectively, comprising:

a surface plasmon polariton direction change device recited in claim 1, a light source, near-field light excitation means for converting light emitted from the light source into a surface plasmon polariton, and near-field light output means for irradiating the magnetic recording medium with near-field light, the surface plasmon polariton direction change device causing the surface plasmon polariton to be propagated from the near-field light excitation means toward the near-field light output means.

10. The read/write head according to claim 9, wherein:

the metal film support member of the surface plasmon polariton direction change device is a substrate having light transmittance, the near-field light excitation means is the substrate, and light is obliquely entered to the surface plasmon polariton direction change device from a side where the substrate is provided so that surface plasmon polariton is excited in at least one of said at least two metal films.

11. The read/write head according to claim 9, wherein:

the predetermined surface of the metal film support member of the surface plasmon polariton direction change device is an output surface from which the light of the light source is emitted, and the near-field light excitation means is provided in at least one of said at least two metal films.

12. The read/write head according to claim 9, wherein a distance from the near-field light excitation means to the near-field light output means is shorter than a propagation length of the surface plasmon polariton.

13. The read/write head according to claim 11, wherein the near-field light excitation means is a small aperture which is smaller than a wavelength of the light emitted from the light source.

14. The read/write head according to claim 9, wherein the near-field light output means is a metal projection.

15. The read/write head according to claim 9, wherein the output surface from which the light of the light source is emitted is within a plane perpendicular to the magnetic recording medium.

16. A laser-assisted magnetic recording apparatus for recording and reproducing information on and from a magnetic recording medium, respectively, comprising a read/write head recited in claim 9.

17. An optical circuit, employing frequency division multiplexing, in an optical communication system, comprising surface plasmon polariton demultiplexing means for demultiplexing surface plasmon polaritons, having different frequencies, in accordance with the frequencies, respectively, the surface plasmon polariton demultiplexing means being a surface plasmon polariton direction change device recited in claim 1.

18. An optical circuit, employing frequency branching multiplexing, in an optical communication system, comprising surface plasmon polariton multiplexing means for multiplexing a plurality of surface plasmon polaritons having different frequencies, the surface plasmon polariton multiplexing means being a surface plasmon polariton direction change device recited in claim 1.

19. An optical circuit, employing time division multiplexing, in an optical communication system, comprising surface plasmon polariton branching means for branching a surface plasmon polariton in a plurality of directions, the surface plasmas poltroon branching means being the surface plasmas polariton direction change device recited in claim 8.

20. An optical circuit, employing time division multiplexing, in an optical communication system, comprising surface plasmon polariton synthesis means for synthesizing surface plasmon polaritons propagated from a plurality of directions, the surface plasmon polariton synthesis means being the surface plasmon polariton direction change device recited in claim 8.

* * * * *